（12）United States Patent
Higuma et al.

(10) Patent No.: US 9,306,398 B2
(45) Date of Patent: Apr. 5, 2016

(54) INPUT/OUTPUT APPARATUS AND REMOTE CONTROL APPARATUS

(75) Inventors: Toshiyasu Higuma, Tokyo (JP);
Masaaki Yabe, Tokyo (JP); Yoshiaki Koizumi, Tokyo (JP); Noriyuki Kushiro, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 977 days.

(21) Appl. No.: 13/145,265

(22) PCT Filed: Mar. 17, 2009

(86) PCT No.: PCT/JP2009/055102
§ 371 (c)(1),
(2), (4) Date: Jul. 19, 2011

(87) PCT Pub. No.: WO2010/106629
PCT Pub. Date: Sep. 23, 2010

(65) Prior Publication Data
US 2011/0285212 A1    Nov. 24, 2011

(51) Int. Cl.
*H02J 17/00* (2006.01)
*H02J 5/00* (2006.01)
*H04L 12/28* (2006.01)

(52) U.S. Cl.
CPC .............. *H02J 5/005* (2013.01); *H04L 12/282* (2013.01); *H04L 2012/285* (2013.01); *H04L 2012/2843* (2013.01); *Y02B 70/325* (2013.01); *Y04S 20/228* (2013.01)

(58) Field of Classification Search
CPC ....................................................... H02J 17/00
USPC ......................................................... 307/104
See application file for complete search history.

(56) References Cited

U.S. PATENT DOCUMENTS

| 5,734,254 | A | * | 3/1998 | Stephens | ........................ | 320/106 |
| 6,275,143 | B1 | * | 8/2001 | Stobbe | ........................ | 340/10.34 |

(Continued)

FOREIGN PATENT DOCUMENTS

| CN | 1956288 A | 5/2007 |
| GB | 2 429 372 A | 2/2007 |
| JP | 6-187514 A | 7/1994 |
| JP | 10-115449 A | 5/1998 |
| JP | 10-320682 A | 12/1998 |

(Continued)

OTHER PUBLICATIONS

Office Action (Decision of Refusal) dated May 7, 2013, issued by the Japanese Patent Office in corresponding Japanese Patent Application No. 2011-100251, and an English translation thereof. (2 pages).

(Continued)

*Primary Examiner* — Rexford Barnie
*Assistant Examiner* — Daniel Kessie
(74) *Attorney, Agent, or Firm* — Buchanan Ingersoll & Rooney PC

(57) ABSTRACT

An input/output apparatus is provided which is capable of preventing electric shock without reinforcing the insulation of a power-supply unit and capable of connecting to a USB, a LAN, or the like. An input/output apparatus includes a power-supply circuit that uses electric power as the power supply of the present apparatus, which is generated in a resonance circuit by an induction of an AC magnetic field from the resonance circuit on the apparatus main body side, and a communication circuit that transmits and receives a signal between a resonance circuit of the present apparatus and a resonance circuit on the apparatus main body side, and capable of being insulated from the power supply of the apparatus main body by receiving electric power from the apparatus main body in a non-contact state and by communicating with the apparatus main body in a non-contact state, thereby.

7 Claims, 20 Drawing Sheets

(56) References Cited

U.S. PATENT DOCUMENTS

| | | | |
|---|---|---|---|
| 7,696,718 B2* | 4/2010 | Suzuki | 320/108 |
| 7,791,311 B2* | 9/2010 | Sagoo | 320/108 |
| 2007/0103110 A1 | 5/2007 | Sagoo | |
| 2008/0258679 A1 | 10/2008 | Manico et al. | |

FOREIGN PATENT DOCUMENTS

| | | |
|---|---|---|
| JP | 11338983 A | 12/1999 |
| JP | 2001033136 A | 2/2001 |
| JP | 2001-112075 A | 4/2001 |
| JP | 2002-198873 A | 7/2002 |
| JP | 2004-084976 A | 3/2004 |
| JP | 2007-198704 A | 8/2007 |
| JP | 2008-288921 A | 11/2008 |

OTHER PUBLICATIONS

Office Action (Text Portion of the Notification of the First Office Action) dated May 3, 2013, issued by the Chinese Patent Office in corresponding Chinese Patent Application No. 200980157717.4, and an English translation thereof. (19 pages).

International Search Report (PCT/ISA/210) issued on May 26, 2009, by Japanese Patent Office as the International Searching Authority for International Application No. PCT/JP2009/055102.

Japanese Office Action issued on Nov. 19, 2010, for Japanese Application No. 2007-318258 (with English language translation).

Japanese Decision of Rejection issued on Feb. 9, 2011, for Japanese Application No. 2007-318258 (with English language translation).

Japanese Office Action dated Jan. 8, 2013, with English-language translation.

Chinese Office Action for corresponding Chinese Appln. No. 200980157717.4 dated Dec. 26, 2013, with English-language translation (16 pages).

The extended European Search Report issued on Aug. 25, 2015, by the European Patent Office in corresponding European Application No. 09841835.3. (7 pages).

\* cited by examiner

F I G. 1
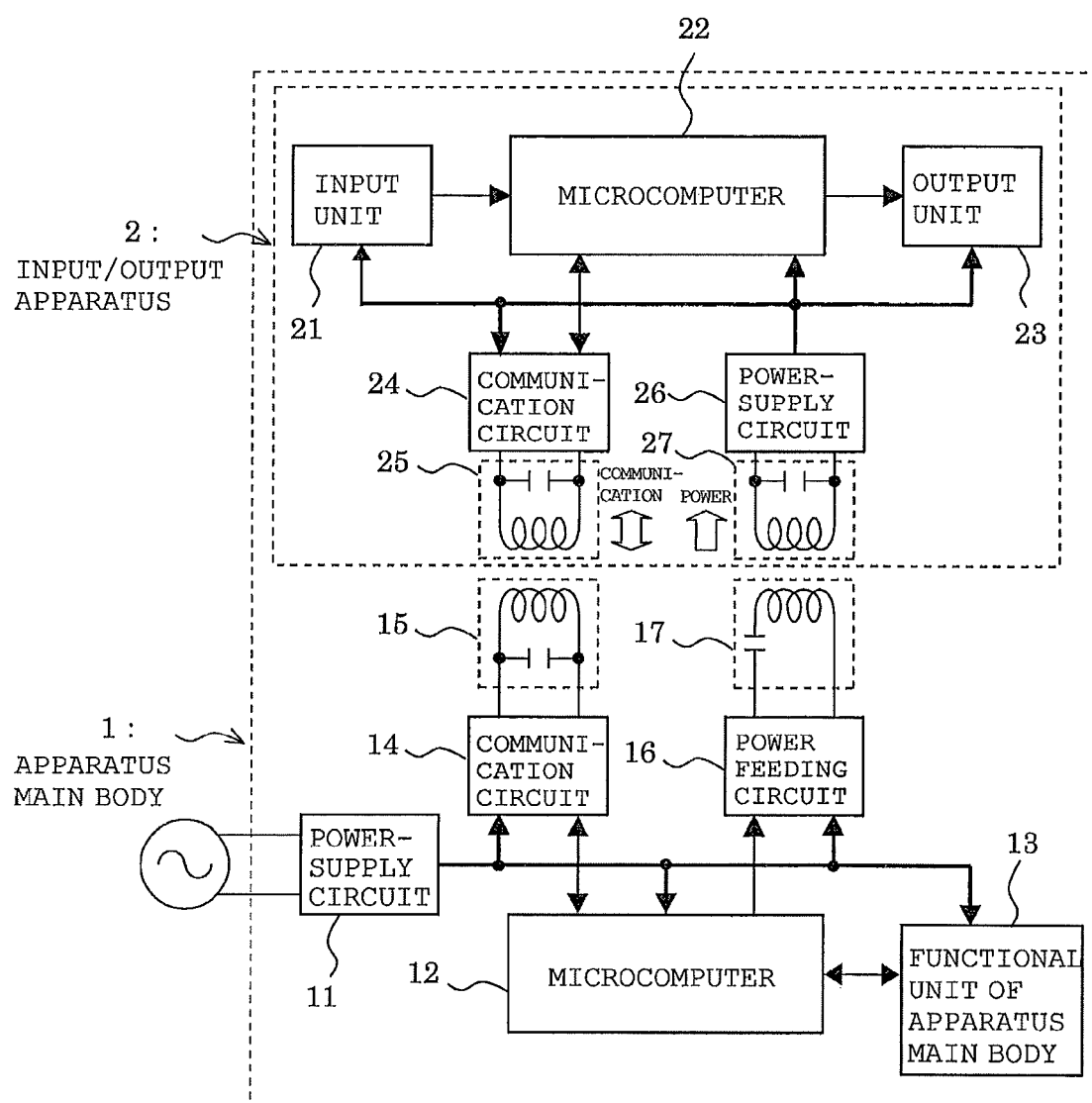

F I G. 1 0
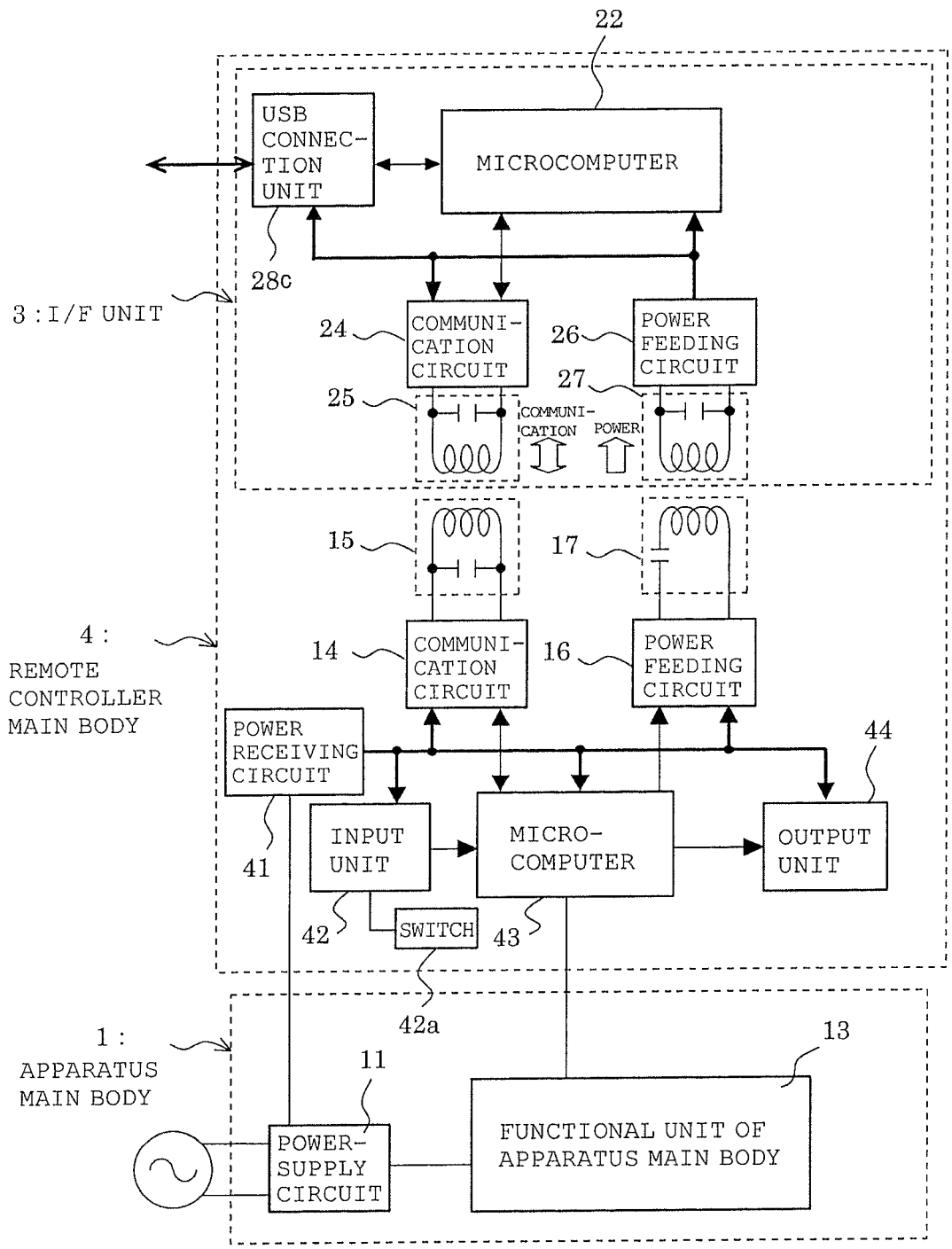

F I G. 1 8
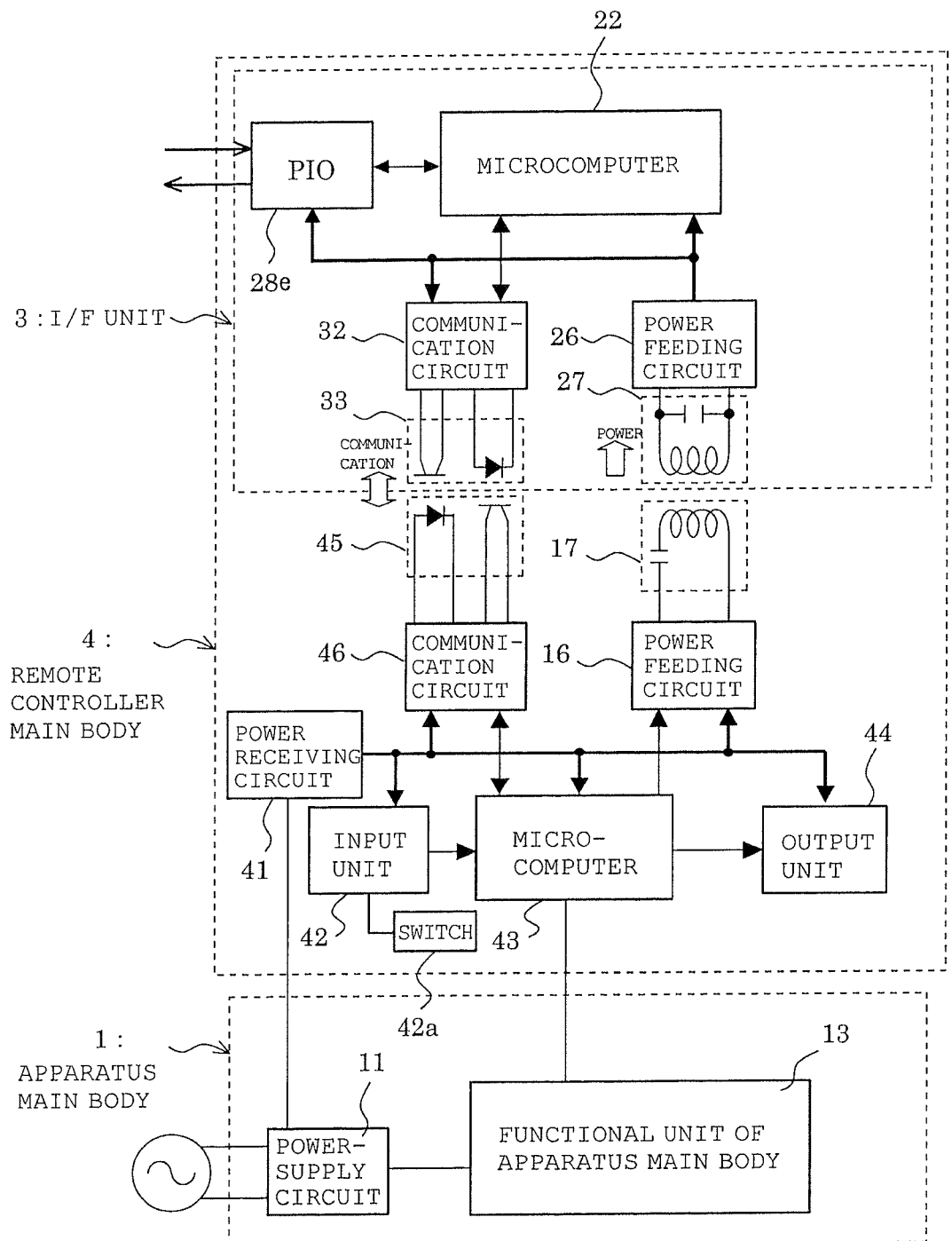

INPUT/OUTPUT APPARATUS AND REMOTE CONTROL APPARATUS

TECHNICAL FIELD

The present invention relates to an input/output apparatus and a remote control apparatus that are equipped with electric apparatuses, such as household electrical appliances and air conditioners.

BACKGROUND ART

Some air conditioners of the related art equip with a wireless remote controller capable of operating (operation, such as driving or stopping) an indoor unit through the wired remote controller instead of a wired remote controller connected through a communication line to an indoor unit. In a case where an indoor unit is operated using one of the two types of remote controllers and thereafter is operated from the other remote controller, the most recent operation is selected with a higher priority (see, for example, Patent Document 1).
[Patent Document 1] Japanese Unexamined Patent Application Publication No. 10-115449

DISCLOSURE OF INVENTION

Problems to be Solved by the Invention

Since the above-mentioned wired remote controller of an air conditioner of the related art is provided with only reception means for receiving an infrared signal from a wireless remote controller, it is not possible to handle USB memories, which have become popular, or the like. This point is solved by providing an input/output terminal, though. Among air conditioners and household electrical appliances, there are electric apparatuses whose power-supply voltage is 200 V. Therefore, for the purpose of preventing a user from being electrically shocked due to insulation breakdown of the power-supply unit and preventing abnormal electrical current from flowing into an external device through an input/output terminal, it is necessary to have a predetermined required structure so that a user does not touch a metal, such as a terminal, or it is necessary to take measures, such as the insulation of the power-supply unit being reinforced, resulting in the problem that the cost is increased. Furthermore, as for structures whose connection portions such as a USB and a 10BASE-T standard for LAN are defined, structural counter measures cannot be taken in most case, which is a problem.

The present invention has been achieved to solve problems such as those described above, and has an object to provide an input/output apparatus and a remote control apparatus in which electric shock can be prevented without reinforcing the insulation of a power-supply unit and to which a USB, a LAN, and the like can be connected.

Means for Solving the Problems

An input/output apparatus according to the present invention is an input/output apparatus that inputs and outputs a signal to and from an electric apparatus, including: at least one resonance circuit formed of a coil and a capacitor; power receiving means in which electric power obtained from the resonance circuit using electromagnetic induction is made to be a power supply of the present apparatus; and communication means that transmits and receives a signal to and from the electric apparatus by using the resonance circuit. By receiving electric power from the electric apparatus in a non-contact state and by communicating with the electric apparatus in a non-contact state, the input/output apparatus is insulated from a power supply of the electric apparatus.

Furthermore, a remote control apparatus according to the present invention is a remote control apparatus that operates electric apparatuses through electric wiring and has an internal I/F unit which inputs and outputs a signal to and from the present apparatus. The I/F unit includes input/output means for transmitting and receiving a signal to and from the outside, at least one resonance circuit formed of a coil and a capacitor, power receiving means in which electric power obtained from the resonance circuit using electromagnetic induction is made to be a power supply of the present I/F unit, and communication means for transmitting and receiving a signal to and from the present apparatus by using the resonance circuit. By receiving electric power from the present apparatus in a non-contact state and by communicating with the present apparatus in a non-contact state, the I/F unit is insulated from a power supply of the present apparatus.

Advantages

According to the present invention, since the input/output apparatus includes a resonance circuit, power receiving means in which electric power obtained from the resonance circuit using electromagnetic induction is made to be a power supply of the present, and communication means that transmits and receives a signal to and from the electric apparatus by using the resonance circuit, it becomes possible to insulate the input/output apparatus from a power supply of the electric apparatus, thereby removing the need to take measures to reinforce insulation for the power supply. Furthermore, it is possible to prevent a user from being electrically shocked due to the insulation breakdown of the power supply of the electric apparatus, and in addition, since the input/output apparatus is insulated from the electric apparatus in the manner described above, connection of a USB, a LAN, and the like is made possible.

Furthermore, according to the present invention, since the I/F unit provided in the remote controller main body includes a resonance circuit, power receiving means for using electric power obtained from the resonance circuit by using electromagnetic induction as the power supply of the present I/F unit, and communication means for transmitting and receiving a signal to and from the present apparatus by using the resonance circuit, it becomes possible to insulate the I/F unit from the power supply of the remote control apparatus, thereby removing the need to take measures to reinforce insulation for the power supply. Furthermore, it is possible to prevent the user from being electrically shocked due to insulation breakdown of the power supply of the remote control apparatus, and in addition, the I/F unit is insulated from the remote controller main body in the manner described above, thereby enabling connection of a USB, a LAN, and the like.

BRIEF DESCRIPTION OF DRAWINGS

FIG. 1 is a block diagram illustrating an example of the configuration of an input/output apparatus according to Embodiment 1 of the present invention.

FIG. 10 is a block diagram when a USB is used for the input/output unit of the I/F unit in Embodiment 2.

FIG. 18 is a block diagram when a PIO is used for the input/output unit of the I/F unit in Embodiment 3.

Figure 2:
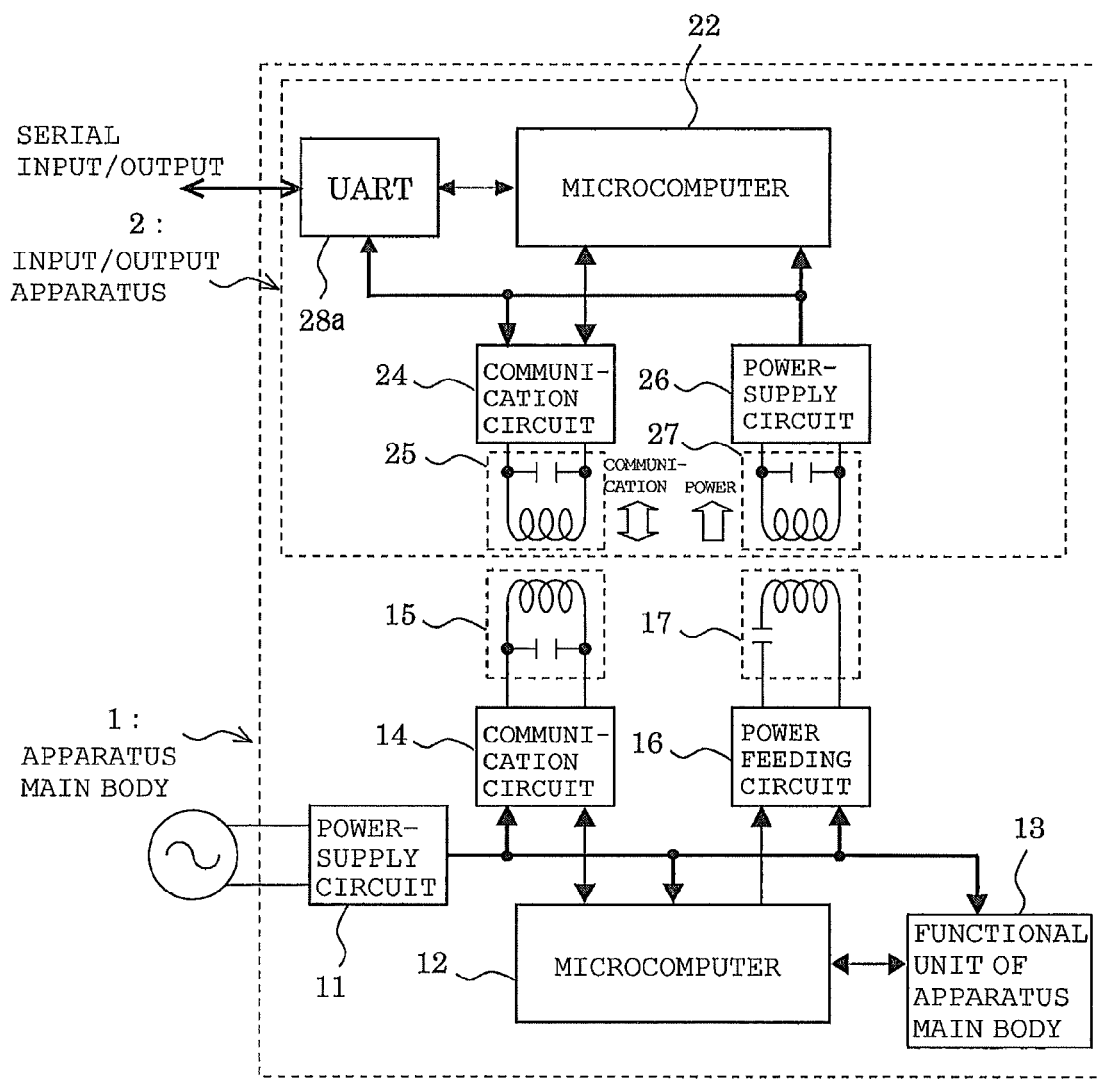
FIG. 2 is a block diagram when a UART is used for the input unit and the output unit of the input/output apparatus in Embodiment 1.

REFERENCE NUMERALS 1 apparatus main body, 11 power-supply circuit, 12 microcomputer, 13 functional unit of apparatus main body, 14 communication circuit, 14a carrier oscillation unit, 14b logical product circuit, 14c amplification circuit, 14d detection circuit, 14e comparator, 141 buffer, 15 transmission and reception unit, 16 power feeding circuit, 16a smoothing circuit, 16b inverter, 17 feeding unit, 2 input/output apparatus, 21 input unit, 22 microcomputer, 23 output unit, 24 communication circuit, 24a carrier oscillation unit, 24b logical product circuit, 24c amplification circuit, 24d detection circuit, 24e comparator, 241 buffer, 25 transmission and reception unit, 26 power-supply circuit, 26a diode, 26b smoothing circuit, 26c power source stabilizing circuit, 26d connector, 27 power receiving unit, 3 I/F unit, 31 input/output unit, 32 communication circuit, 33 transmission and reception unit, 4 remote controller main body, 41 power receiving circuit, 42 input unit, 43 microcomputer, 44 output unit, 45 transmission and reception unit, 46 communication circuit.

BEST MODES FOR CARRYING OUT THE INVENTION

Embodiment 1

FIG. 1 is a block diagram illustrating an example of the configuration of an input/output apparatus according to Embodiment 1 of the present invention.

In the figure, an electric apparatus (hereinafter referred to as an "apparatus main body 1") of a household electrical appliance, such as, for example, a rice cooker and an electromagnetic cooking device includes a power-supply circuit 11 connected to a commercial power supply, a microcomputer 12, a functional unit of the apparatus main body 13, a communication circuit 14 having a transmission and reception unit 15, a power feeding circuit 16 having a feeding unit 17, and an input/output apparatus 2. When a commercial power supply is applied, the power-supply circuit 11 generates a predetermined constant voltage to supply to the microcomputer 12, the functional unit of the apparatus main body 13, the communication circuit 14, and the power feeding circuit 16 respectively. When the power supply is switched on, the microcomputer 12 causes the power feeding circuit 16 to operate so as to cause the feeding unit 17 to generate an AC magnetic field, so that the input/output apparatus 2 side is made to receive an AC voltage. The functional unit of the apparatus main body 13 is a circuit unit for achieving various functions included in the apparatus main body 1, and operates under the control of the microcomputer 12.

The input/output apparatus 2 includes an input unit 21 having various operation switches (not shown), a microcomputer 22, an output unit 23 having an LED and a liquid-crystal display (not shown), a communication circuit 24 (communication means) having a transmission and reception unit 25 arranged so as to face the transmission and reception unit 15, and a power-supply circuit 26 (power receiving means) having a power receiving unit 27 arranged so as to face the feeding unit 17. When an AC voltage is generated in the power receiving unit 27 due to the induction of an AC magnetic field, the power-supply circuit 26 generates a predetermined constant voltage on the basis of the AC voltage, and supplies it to the input unit 21, the microcomputer 22, the output unit 23, and the communication circuit 24.

Figure 19:
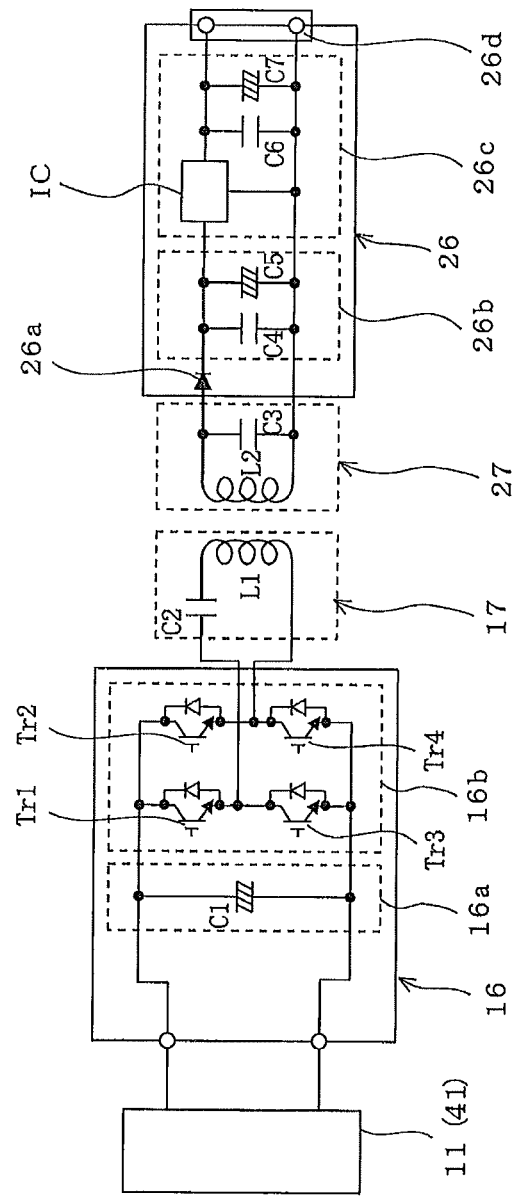
FIG. 19 is a circuit diagram illustrating the configuration of a power feeding circuit of an apparatus main body and a power-supply circuit of an input/output apparatus.

Here, a description will be given below, with reference to FIG. 19, of the configuration of the power feeding circuit 16 and the power-supply circuit 26. FIG. 19 is a circuit diagram illustrating the configuration of a power feeding circuit of an apparatus main body and a power-supply circuit of an input/output apparatus.

In the figure, the power feeding circuit 16 of the apparatus main body 1 has, at its output end, the feeding unit 17 of a series resonance circuit in which a capacitor C2 and a coil L1 are connected in series with each other, and includes a smoothing circuit 16a formed of a smoothing capacitor C1 connected between the output ends of the power-supply circuit 11, and a full-bridge type inverter 16b. In this inverter 16b, switching elements Tr1 and Tr4 are turned on, and switching elements Tr2 and Tr4 are turned off under the control of the microcomputer 12. Next, the switching elements Tr1 and Tr4 are turned on, the switching elements Tr2 and Tr4 are turned off, and this operation is repeatedly performed at the period of the resonance frequency of the series resonance circuit, and the AC electric current is supplied to the feeding unit 17, causing the coil L1 of the feeding unit 17 to generate an AC magnetic field.

The power-supply circuit 26 of the input/output apparatus 2 has, at its input end, the power receiving unit 27 of a parallel resonance circuit in which a coil L2 and a capacitor C3 are connected in parallel with each other, and includes a diode 26a for rectifying the AC voltage that is generated by the induction of the AC magnetic field on the feeding unit 17 side in the power receiving unit 27, a smoothing circuit 26b formed of a capacitor C4 and a smoothing capacitor C5, a power source stabilizing circuit 26c formed of a power-supply regulator IC, a capacitor C6, and a smoothing capacitor C7, and a connector 26d provided at the output end of the power source stabilizing circuit 26c. The above-mentioned smoothing circuit 26b smoothes the commercial frequency components of the rectified voltage from the diode 26a by using the capacitor C4 and the smoothing capacitor C5. The power source stabilizing circuit 26c stabilizes the output voltage of the smoothing circuit 26b by using a power-supply regulator IC, and suppresses a voltage variation due to a sudden load variation by the capacitor C6 and the smoothing capacitor C7.

The coil L1 of the feeding unit 17 is separated from the coil L2 of the power receiving unit 27 by a distance in the range of, for example, several mm to several cm. The spacing is determined by the injection electric power of the power feeding circuit 16, the electric power consumption on the input/output apparatus 2 side, and adjustment of the configuration (for example, the area of the coils L1 and L2) of the feeding unit 17 and the power receiving unit 27. For the coil L1 of the feeding unit 17 and the coil L2 of the power receiving unit 27, in general, an air-core coil, an air-core coil in which a magnetic material is arranged on a portion of the end surface thereof or in which a conductor is wound around a ferrite material, or the like is used. Furthermore, in addition to this, a conductor circuit in the form of a flexible sheet, or a sheet-like conductor circuit in which a similar sheet-like magnetic material is arranged on one side thereof may be used.

Figure 20:
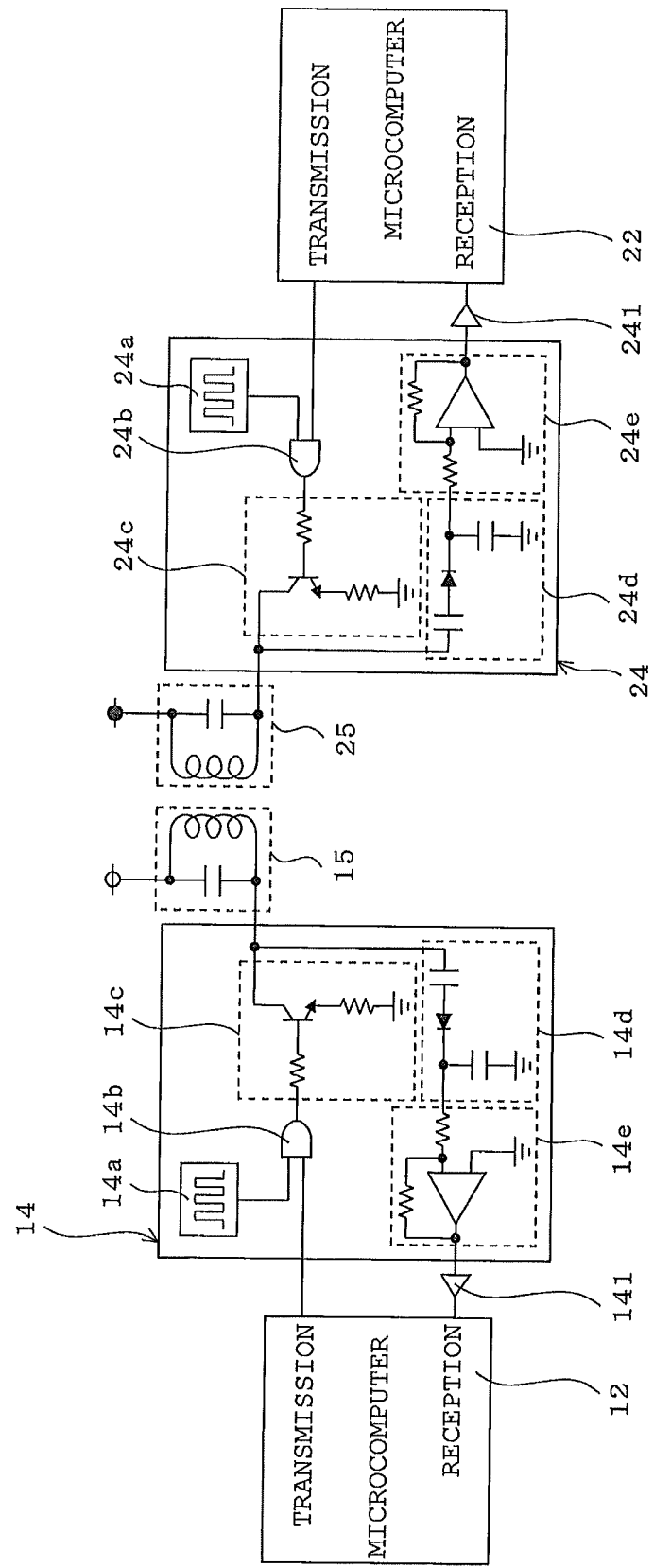
FIG. 20 is a circuit diagram illustrating the configuration of each of communication circuits of the apparatus main body and the input/output apparatus.

Next, a description will be given, with reference to FIG. 20, of the configuration of communication circuits 14 and 24. FIG. 20 is a circuit diagram illustrating the configuration of each of communication circuits of an apparatus main body and an input/output apparatus.

The communication circuit 14 of the apparatus main body 1 has the transmission and reception unit 15 of a parallel resonance circuit in which a capacitor and a coil are connected in parallel with each other, and includes a carrier oscillation unit 14a for oscillating a high-frequency signal, a logical product circuit 14b for generating the logical product of the high-frequency signal from the carrier oscillation unit 14a and data from the microcomputer 12 so as to be subjected to amplitude-shift keying (ASK), an amplification circuit 14c for amplifying the output signal of the logical product circuit 14b to predetermined electric power so as to excite the transmission and reception unit 15 and for causing a high-frequency magnetic field to be generated from the coil of the transmission and reception unit 15, a detection circuit 14d for smoothing the high-frequency AC voltage generated in the transmission and reception unit 15 by the induction of the high-frequency magnetic field on the transmission and reception unit 25 side and removing high frequency components, and a comparator 14e for comparing the signal from the detection circuit 14d with a reference value and outputting the result (binary value) to the microcomputer 12 through a buffer 141.

Similarly to the above, the communication circuit 24 of the input/output apparatus 2 has the transmission and reception unit 25 of a parallel resonance circuit in which a capacitor and a coil are connected in parallel to each other, and includes a carrier oscillation unit 24a for oscillating a high-frequency signal, a logical product circuit 24b for generating the logical product of the high-frequency signal from the carrier oscillation unit 24a and data from the microcomputer 22 so as to be subjected to amplitude-shift keying (ASK), an amplification circuit 24c for amplifying the output signal of the logical product circuit 24b to predetermined electric power so as to excite the transmission and reception unit 25 and causing a high-frequency magnetic field to be generated from the coil of the transmission and reception unit 25, a detection circuit 24d for smoothing the high-frequency AC voltage generated in the transmission and reception unit 25 by the induction of the high-frequency magnetic field on the transmission and reception unit 15 side and removing high frequency components, and a comparator 24e for comparing the signal from the detection circuit 24d with a reference value and outputting the result (binary value) to the microcomputer 22 through a buffer 241.

Similarly to the above, the coils of the communication circuits 14 and 24 are separated from each other by a distance in the range of several mm to several cm, and the spacing is determined by the transmission and reception level, adjustment of the reception sensitivity for the signal and adjustment of the configuration of each of the coils of the transmission and reception units 15 and 25. For the coil, in general, an air-core coil, an air-core coil in which a magnetic material is arranged on a portion of the end surface thereof or in which a conductor is wound around a ferrite material, or the like is used.

In the electric apparatus configured as described above, when a commercial power supply is applied to the power-supply circuit 11 of the apparatus main body 1, as described above, the power-supply circuit 11 generates a predetermined constant voltage, and supplies it to the microcomputer 12, the functional unit of the apparatus main body 13, the communication circuit 14, and the power feeding circuit 16 inside the apparatus main body 1. When the power supply is switched on, the microcomputer 12 causes the power feeding circuit 16 to operate. That is, the inverter 16b of an power feeding circuit 16 is driven, and an alternating electric current is supplied to the feeding unit 17 so that the coil L1 is made to generate an AC magnetic field. When an AC voltage is generated in the coil L2 of the power receiving unit 27 of the input/output apparatus 2 by the induction of the AC magnetic field, the power-supply circuit 26 of the input/output apparatus 2 rectifies the AC voltage from the power receiving unit 27 so as to smooth the AC voltage, makes the AC voltage be a predetermined constant voltage, and supplies it to the input unit 21, the microcomputer 22, the output unit 23, and the communication circuit 24 inside the input/output apparatus 2, thereby causing them to enter an operable state. At this time, the output unit 23 turns on an LED (not shown) so as to indicate that power is being applied.

When a signal based on a switch operation is output to the microcomputer 22 from the input unit 21 while power is supplied to the input/output apparatus 2, the microcomputer 22 outputs data based on the signal from the input unit 21 to the communication circuit 24 so as to be operated. At this time, the communication circuit 24 generates the logical product of the high-frequency signal of the carrier oscillation unit 24a and the data from the microcomputer 22 so as to be subjected to amplitude-shift keying, amplifies the result, excites the transmission and reception unit 25, and causes a high-frequency magnetic field to be generated from the transmission and reception unit 25. When a high-frequency AC voltage is generated in the transmission and reception unit 15 of the apparatus main body 1 by the induction of the high-frequency magnetic field, the communication circuit 14 of the apparatus main body 1 smoothes the high-frequency AC voltage from the transmission and reception unit 15 so as to remove high frequency components, extracts to binarize the data from the input unit 212, and outputs it to the microcomputer 12 of the apparatus main body 1 through the buffer 141.

The microcomputer 12, when the data from the communication circuit 14 is input, controls the functional unit of the apparatus main body 13 in accordance with the data. When a signal indicating that the operating state has changed is sent from the functional unit of the apparatus main body 13 under this control, data based on the signal is output to the communication circuit 14 so as to be operated, and a high-frequency magnetic field is generated from the transmission and reception unit 15 in the same manner as described above. At this time, the transmission and reception unit 25 of the input/output apparatus 2 generates a high-frequency AC voltage by way of the induction of the high-frequency magnetic field and outputs the high-frequency AC voltage to the communication circuit 24. The communication circuit 24 smoothes the high-frequency AC voltage so as to remove high frequency components, extracts to binarize the data, and outputs it to the microcomputer 22 of the input/output apparatus 2 through the buffer 241. The microcomputer 22 outputs the data from the functional unit of the apparatus main body 13, that is, the changed operating state, as a result of the operation of the functional unit of the apparatus main body 13 to the output unit 23, causing the liquid-crystal display to perform display.

As described above, according to Embodiment 1, the transmission and reception of data is performed by using the transmission and reception units 15 and 25 of parallel resonance circuits for the communication circuits 14 and 24 of the apparatus main body 1 and the input/output apparatus 2, respectively. Furthermore, by using the feeding unit 17 of a series resonance circuit for the power feeding circuit 16 of the apparatus main body 1 and by using the power receiving unit 27 of a parallel resonance circuit for the power-supply circuit 26 of the input/output apparatus 2, electric power is supplied from the power feeding circuit 16 to the power-supply circuit 26, thereby making it possible to insulate the input/output apparatus 2 from the power supply of the apparatus main body 1. For this reason, it is not necessary to take measures to reinforce insulation with respect to the power supply, and it is possible to prevent the user from being electrically shocked due to insulation breakdown on the power-supply circuit 11 side of the apparatus main body 1.

Although Embodiment 1 describes, as an example, transmission and reception of data in accordance with an amplitude shift keying method to and from the communication circuits 14 and 24 of the apparatus main body 1 and the input/output apparatus 2, data may be transmitted and received by using a baseband method, a phase shift keying (PSK) method, a frequency shift keying (FSK) method, a quadrature amplitude modulation (QAM) method, or the like.

Furthermore, although coils are used for power supply and for communication use respectively, power is supplied intermittently so that communication may be performed at an idle time, or the power-supply frequency itself is modulated using data so that the coil may be shared. Furthermore, although the microcomputer 12 is used for the apparatus main body 1, a logic such as an FPGA (Field Programmable Gate Array), or other control means may be used.

Figure 3:
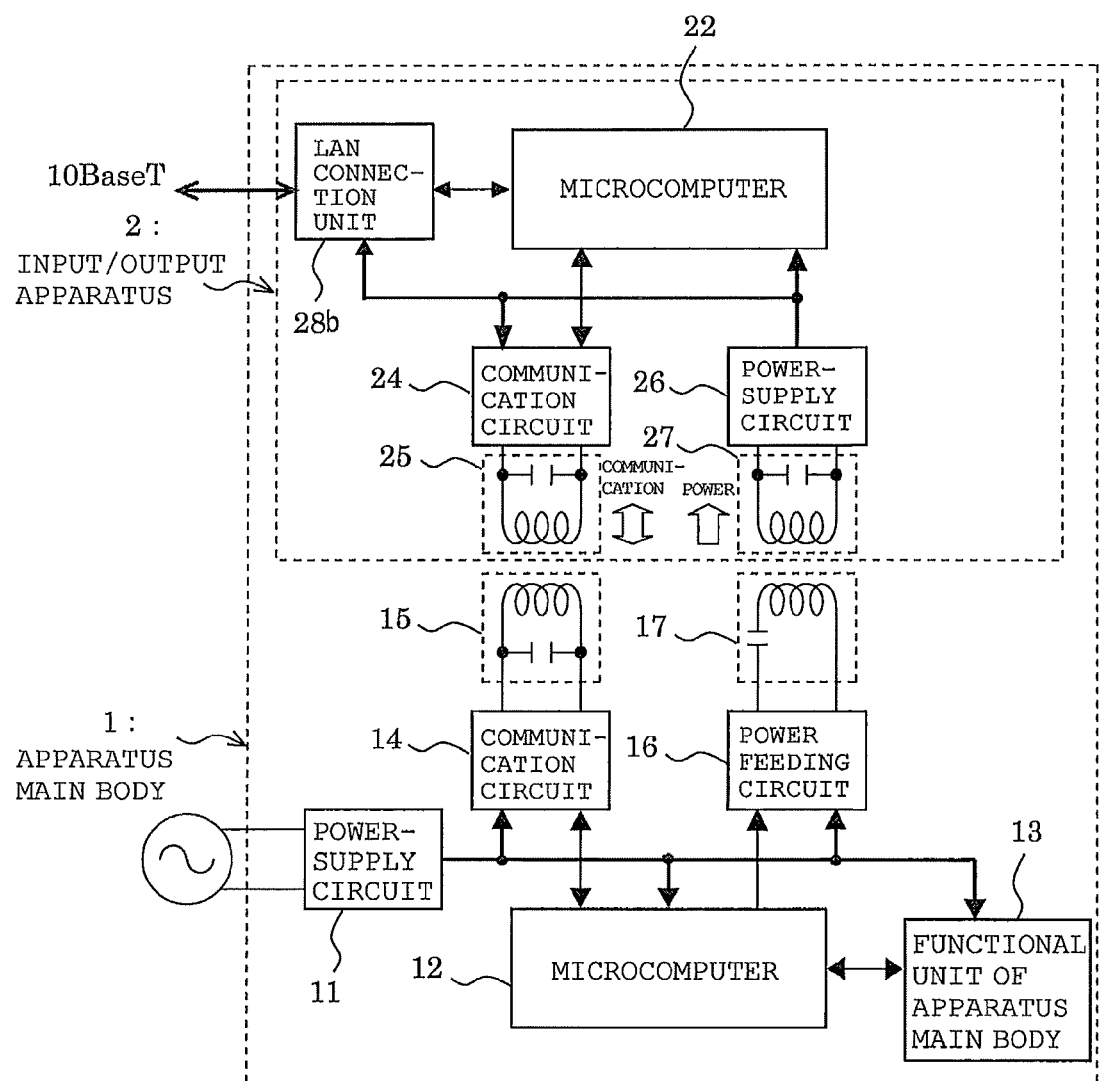
FIG. 3 is a block diagram when a LAN is used for the input unit and the output unit of the input/output apparatus in Embodiment 1.
Figure 4:
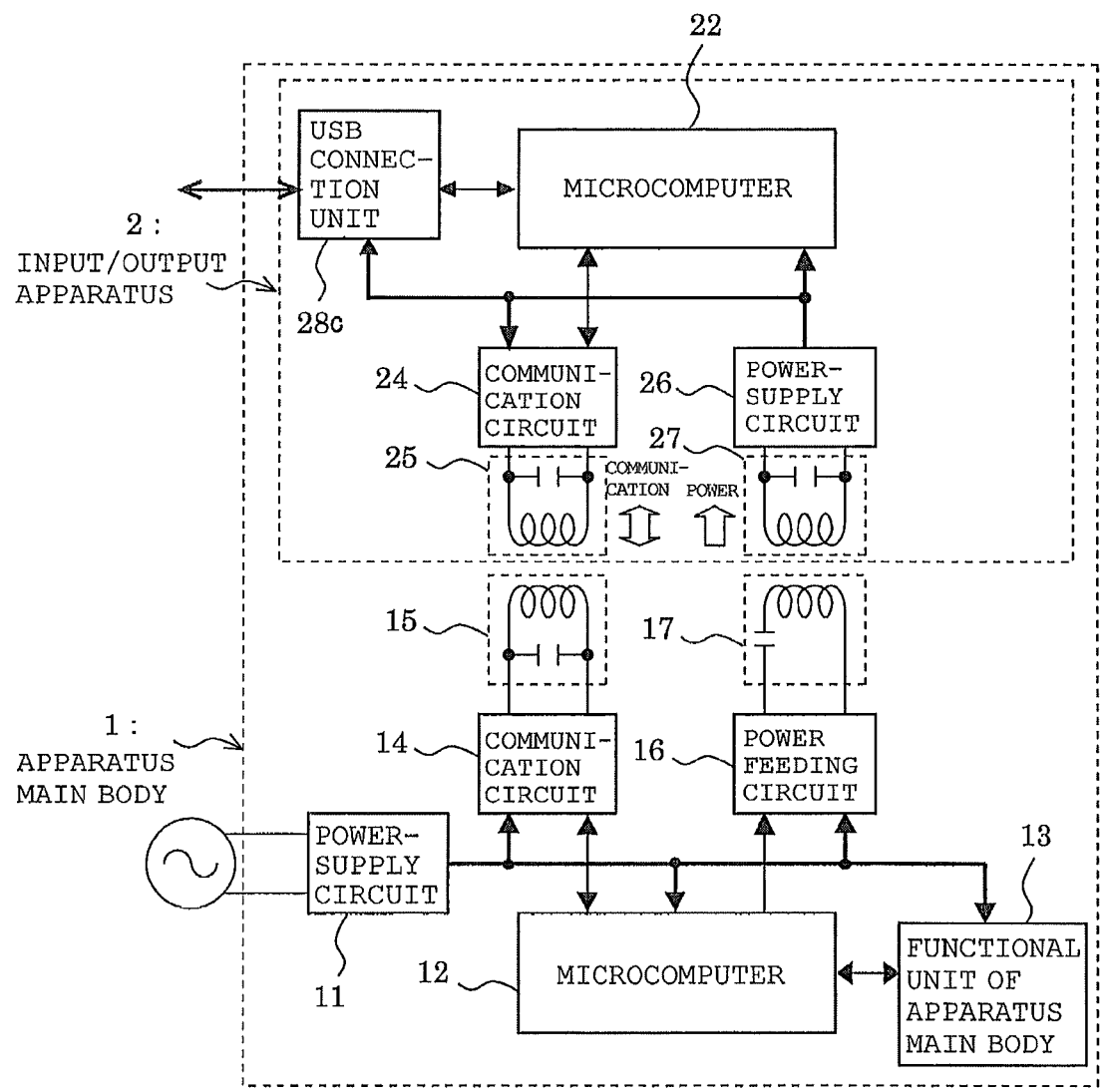
FIG. 4 is a block diagram when a USB is used for the input unit and the output unit of the input/output apparatus in Embodiment 1.
Figure 5:
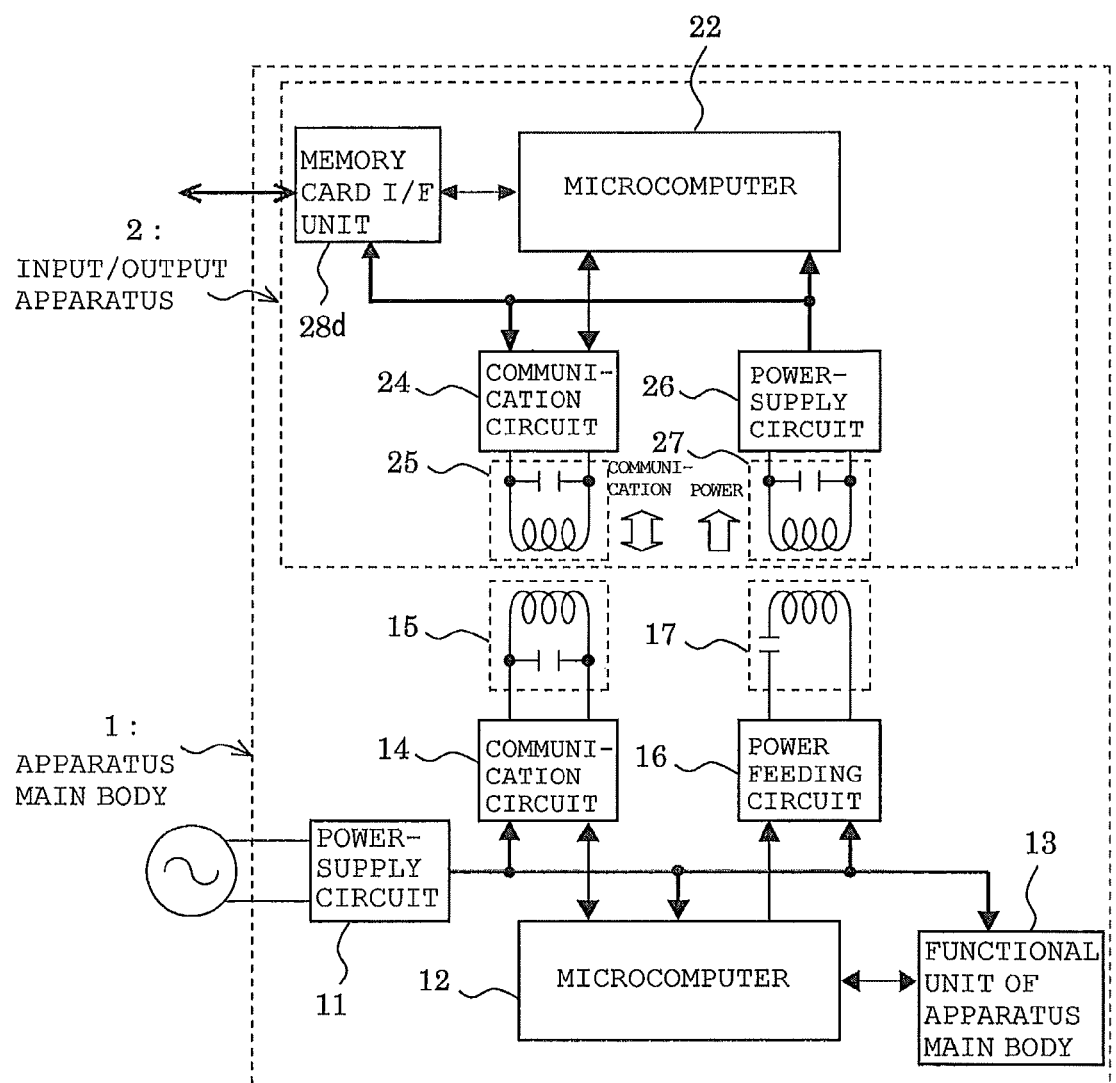
FIG. 5 is a block diagram when a memory card I/F unit is used for the input unit and the output unit of the input/output apparatus in Embodiment 1.
Figure 6:
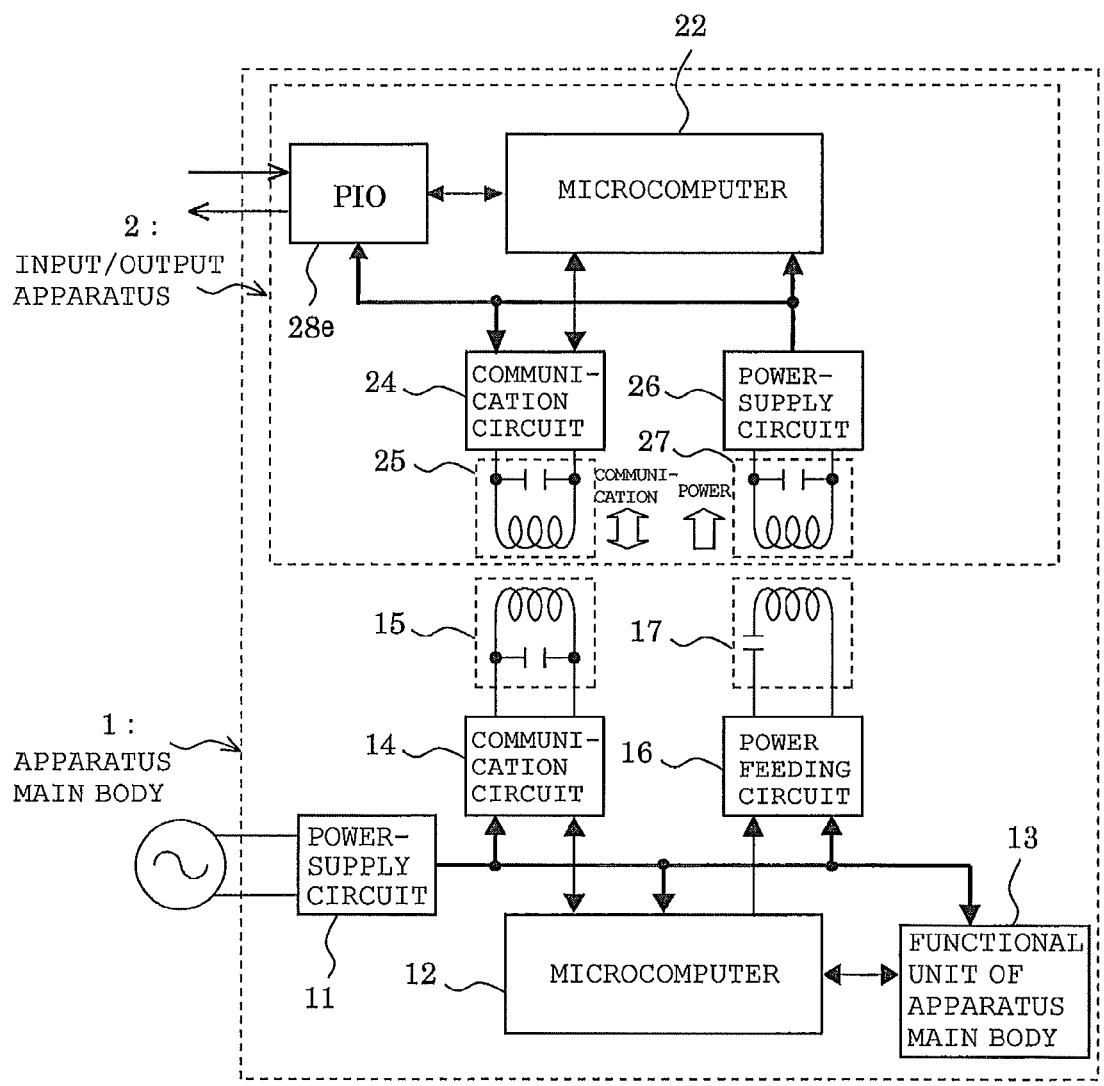
FIG. 6 is a block diagram when a PIO is used for the input unit and the output unit of the input/output apparatus in Embodiment 1.

Furthermore, although, in Embodiment 1, the input/output apparatus 2 including the input unit 21 and the output unit 23 is used as an example, the input/output apparatus 2 including a UART (Universal Asynchronous Receiver Transmitter) 28a may be used, as shown in FIG. 2. This UART is a device that, for example, converts a serial signal from an external device, such as a personal computer (not shown), into a parallel signal and transfers the parallel signal to the microcomputer 22 and that converts the parallel signal from the microcomputer 22 into a serial signal and transfers the serial signal to the external device. Furthermore, as shown in FIG. 3, a LAN connection unit 28b that is connected a 10Base-T LAN may be used, or as shown in FIG. 4, a USB (Universal Serial Bus) connection unit 28c may be provided so as to transmit and receive data to and from an external device. Furthermore, as shown in FIG. 5, a memory card I/F unit 28d may be used. In this case, data is read from a memory card loaded into the memory card I/F unit 28d and is transferred to the microcomputer 12 of the apparatus main body 1, or data from the apparatus main body 1 is recorded in the memory card. Furthermore, as shown in FIG. 6, a PIO (Parallel input/output) 28e may be used so that transmission and reception of data to and from an external device can be performed. These units can be used because the input/output apparatus 2 is insulated from the power supply of the apparatus main body 1, and can be provided in the input/output apparatus 2 without taking any counter measures structurally.

Embodiment 2

Figure 7:
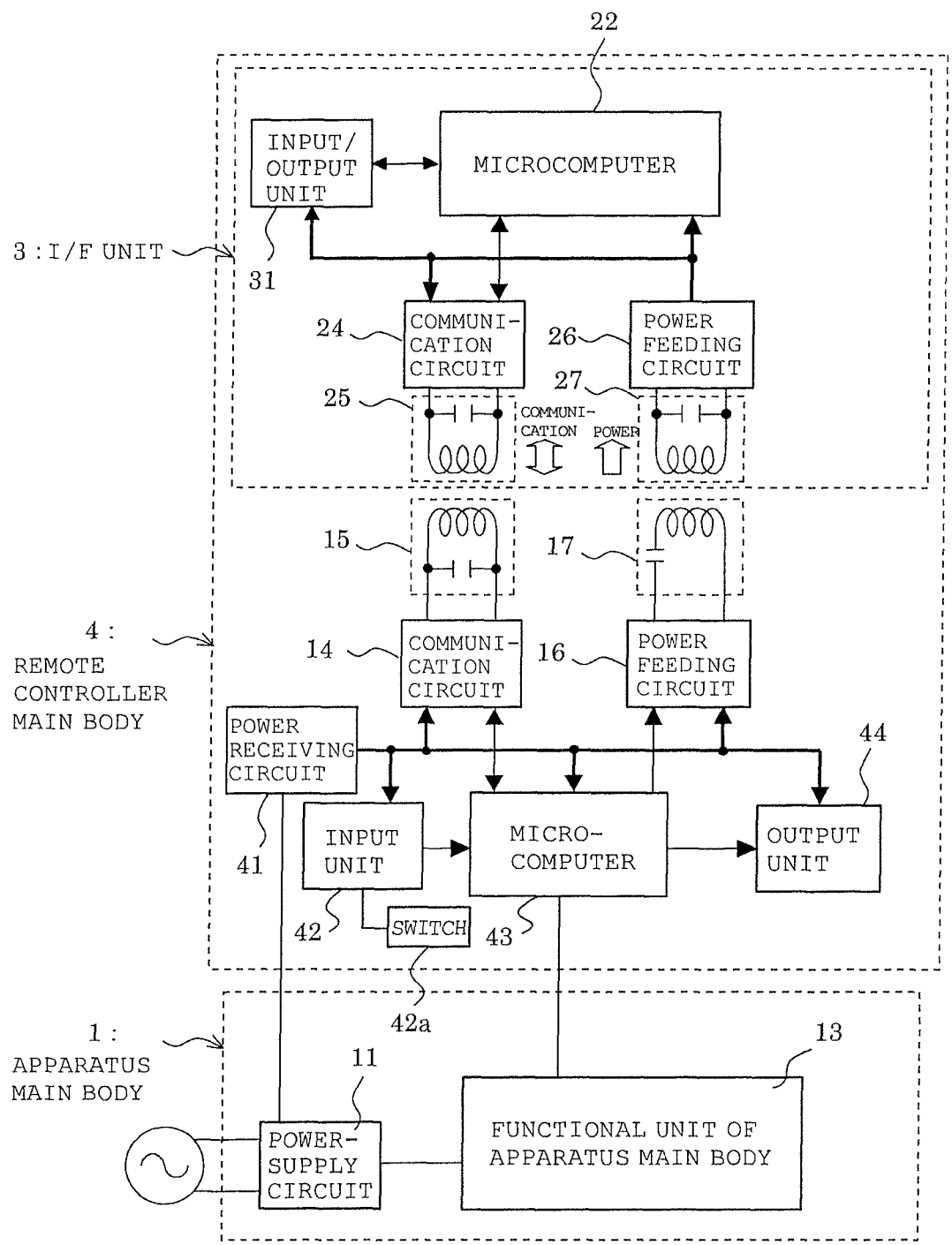
FIG. 7 is a block diagram illustrating an example of the configuration of a remote control apparatus according to Embodiment 2 of the present invention.

FIG. 7 is a block diagram illustrating an example of the configuration of a remote control apparatus according to Embodiment 2 of the present invention. Components that are the same as or that correspond to those of Embodiment 1 described with reference to FIG. 1 are designated with the same reference numerals, and descriptions thereof are omitted.

In the figure, the remote control apparatus (hereinafter referred to as a "remote controller main body 4") includes a power receiving circuit 41 that is connected through a power-supply line to the power-supply circuit 11 of the apparatus main body 1, which is, for example, an air conditioner, an input unit 42 having various switches 42a, a microcomputer 43 connected to the functional unit of the apparatus main body 13 of the apparatus main body 1 through a communication line, an output unit 44 having an LED and a liquid-crystal display (not shown), a communication circuit 14 having a transmission and reception unit 15, a power feeding circuit 16 having a feeding unit 17, and an I/F (interface) unit 3.

The power receiving circuit 41, when the voltage from the power-supply circuit 11 of the apparatus main body 1 is applied, generates a predetermined constant voltage, and supplies it to the input unit 42, the microcomputer 43, the output unit 44, the communication circuit 14, and the power feeding circuit 16. The output unit 44, when power is applied, turns on an LED, thereby displaying that the remote controller main body 4 has been powered on. The microcomputer 43 will be described in detail when the operation is described. The I/F unit 3 includes the microcomputer 22, the communication circuit 24 (communication means) having the transmission and reception unit 25 arranged so as to face the transmission and reception unit 15, the power-supply circuit 26 (power receiving means) having the power receiving unit 27 arranged so as to face the feeding unit 17, and the input/output unit 31 that transfers a signal from an external device (not shown), such as a personal computer, to the microcomputer 22 and transfers a signal from the microcomputer 22 to the external device.

In the remote control apparatus configured as described above, for example, when a signal based on an operation of the switch 42a from the input unit 42 of the remote controller main body 4 is output to the microcomputer 43, the microcomputer 43 controls the functional unit of the apparatus main body 13 on the basis of the signal from the input unit 42.

As a result of this control, when a signal indicating the current operating state is input from the functional unit of the apparatus main body 13, the signal is read, and the current operating state caused by the functional unit of the apparatus main body 13 is displayed on the liquid-crystal display through the output unit 44.

Next, a description will be given of an operation when the operating state of the functional unit of the apparatus main body 13 is transferred from the input/output unit 31 to the external device on the basis of the operation of the remote controller main body 4.

When the microcomputer 43 of the remote controller main body 4 detects, through the input unit 42, an instruction of transferring data indicating the operating state of the functional unit of the apparatus main body 13 to the external device, and then outputs a data reading instruction to the functional unit of the apparatus main body 13 through a communication line in accordance with the instruction. Then, in response to the instruction when necessary data is input through the communication line, the power feeding circuit 16 is made to operate, causing the coil L1 of the feeding unit 17 to generate an AC magnetic field. When an AC voltage is generated in the coil L2 of the power receiving unit 27 of the I/F unit 3 by the induction of the AC magnetic field, the power-supply circuit 26 of the I/F unit 3 generates a predetermined constant voltage on the basis of the AC voltage of the power receiving unit 27, and supplies it to the microcomputer 22, the communication circuit 24, and the input/output unit 31.

Furthermore, the microcomputer 43 of the remote controller main body 4 causes the power feeding circuit 16 to operate, and thereafter outputs the data obtained from the functional unit of the apparatus main body 13 to the communication circuit 14 so that the high-frequency signal (carrier signal) is amplitude-shift keyed and a high-frequency magnetic field is generated from the transmission and reception unit 15. When a high-frequency AC voltage is generated in the transmission and reception unit 25 of the I/F unit 3 by the induction of the high-frequency magnetic field, the communication circuit 24 of the I/F unit 3 smoothes the high-frequency AC voltage of the transmission and reception unit 25 so as to remove the high frequency components, extracts to binarize the data of the functional unit of the apparatus main body 13, and outputs to the microcomputer 22 of the I/F unit 3 through the buffer 141. The microcomputer 22 outputs the data from the functional unit of the apparatus main body 13 to the input/output unit 31 in accordance with a predetermined procedure, so that the data is transferred to an external device.

Next, a description will be given of operations when data is input from the input/output unit 31 to the functional unit of the apparatus main body 13 on the basis of the operation of the remote controller main body 4. This operation assumes an operation from the outside, a change of parameters for the operation, or the like.

When the microcomputer 43 of the remote controller main body 4 detects, through the input unit 42, an instruction of transferring data from the external device to the functional unit of the apparatus main body 13, the microcomputer 43 causes the power feeding circuit 16 to operate, so that an AC magnetic field is generated in the coil L1 of the feeding unit 17. Next, a data receiving instruction is output to the communication circuit 14 in accordance with an instruction from the input unit 42 so as to operate, and a high-frequency magnetic field is generated from the transmission and reception unit 15.

On the other hand, when an AC voltage is generated in the coil L2 of the power receiving unit 27 by the induction of the AC magnetic field from the feeding unit 17, the power-supply circuit 26 of the I/F unit 3 generates a predetermined constant voltage on the basis of the AC voltage, supplies it to the microcomputer 22, the communication circuit 24 and the input/output unit 31. At this time, the communication circuit 24 smoothes the high-frequency AC voltage that is generated in the transmission and reception unit 25 by of the induction of the high-frequency magnetic field of the transmission and reception unit 15 to remove the high frequency components, extracts to binarize the data receiving instruction output from the microcomputer 43 of the remote controller main body 4, and outputs it to the microcomputer 22 through the buffer 141.

The microcomputer 22 of the I/F unit 3, when the data receiving instruction is detected, reads the received data from the input/output unit 31 in accordance with a predetermined procedure, outputs the data to the communication circuit 24, whereby the high-frequency signal is amplitude-shift keyed, and causes a high-frequency magnetic field to be generated from the transmission and reception unit 25. When a high-frequency AC voltage is generated in the transmission and reception unit 15 of the remote controller main body 4 by the induction of the high-frequency magnetic field, the communication circuit 14 of the remote controller main body 4 smoothes the high-frequency AC voltage of the transmission and reception unit 15 so as to remove high frequency components, extracts to binarize the received data from the input/output unit 31, and outputs it to the microcomputer 43 of the remote controller main body 4 through the buffer 141. The microcomputer 43 outputs the received data to the functional unit of the apparatus main body 13, and the functional unit of the apparatus main body 13 controls its own state or changes internal parameters on the basis of the received data.

As described above, according to Embodiment 2, since transmission and reception of data is performed by using the transmission and reception units 15 and 25 of parallel resonance circuits are used for the communication circuits 14 and 24 of the remote controller main body 4 and the I/F unit 3, respectively, and furthermore, since power is supplied from the power feeding circuit 16 to the power-supply circuit 26 by using the feeding unit 17 of a series resonance circuit for the power feeding circuit 16 of the remote controller main body 4 and by using the power receiving unit 27 of a parallel resonance circuit for the power-supply circuit 26 of the I/F unit 3, it is possible to insulate the I/F unit 3 from the power supply of the remote controller main body 4. Consequently, it is not necessary to take measures to reinforce insulation with respect to the power supply, and it is possible to suppress the damage of the I/F unit 3 due to insulation breakdown on the power receiving circuit 41 side of the remote controller main body 4, and suppress the flow of abnormal electrical current into the external device through the input/output unit 31.

In Embodiment 2, although the power feeding circuit 16 of the remote controller main body 4 is made to operate so as to cause the I/F unit 3 to receive power when the data of the functional unit of the apparatus main body 13 is to be transferred from the input/output unit 31 to the external device or when the data received by the input/output unit 31 is to be passed to the functional unit of the apparatus main body 13, the supply of power to the I/F unit 3 may be performed periodically or constantly, and the microcomputer 22 may be made to access the input/output unit 31 so as to make a determination as to the presence or absence of data, and may transmit and receive in accordance with the content of the data.

Furthermore, although an example in which the communication circuits 14 and 24 of the remote controller main body 4 and the I/F unit 3 transmit and receive data in accordance with an amplitude shift keying method has been described, the transmission and reception of data may be performed by using a baseband method, a phase shift keying (PSK) method, a frequency shift keying (FSK) method, a quadrature amplitude modulation (QAM) method, or the like.

Furthermore, although a coil is used for feeding power and for communication use respectively, power feeding may be performed intermittently, communication may be performed at an idle time, and the power-supply frequency itself is modulated using data, so that the coil is shared. Furthermore, although the microcomputer 43 is used for the remote controller main body 4, a logic such as an FPGA (Field Programmable Gate Array), or other control means may be used.

Figure 8:
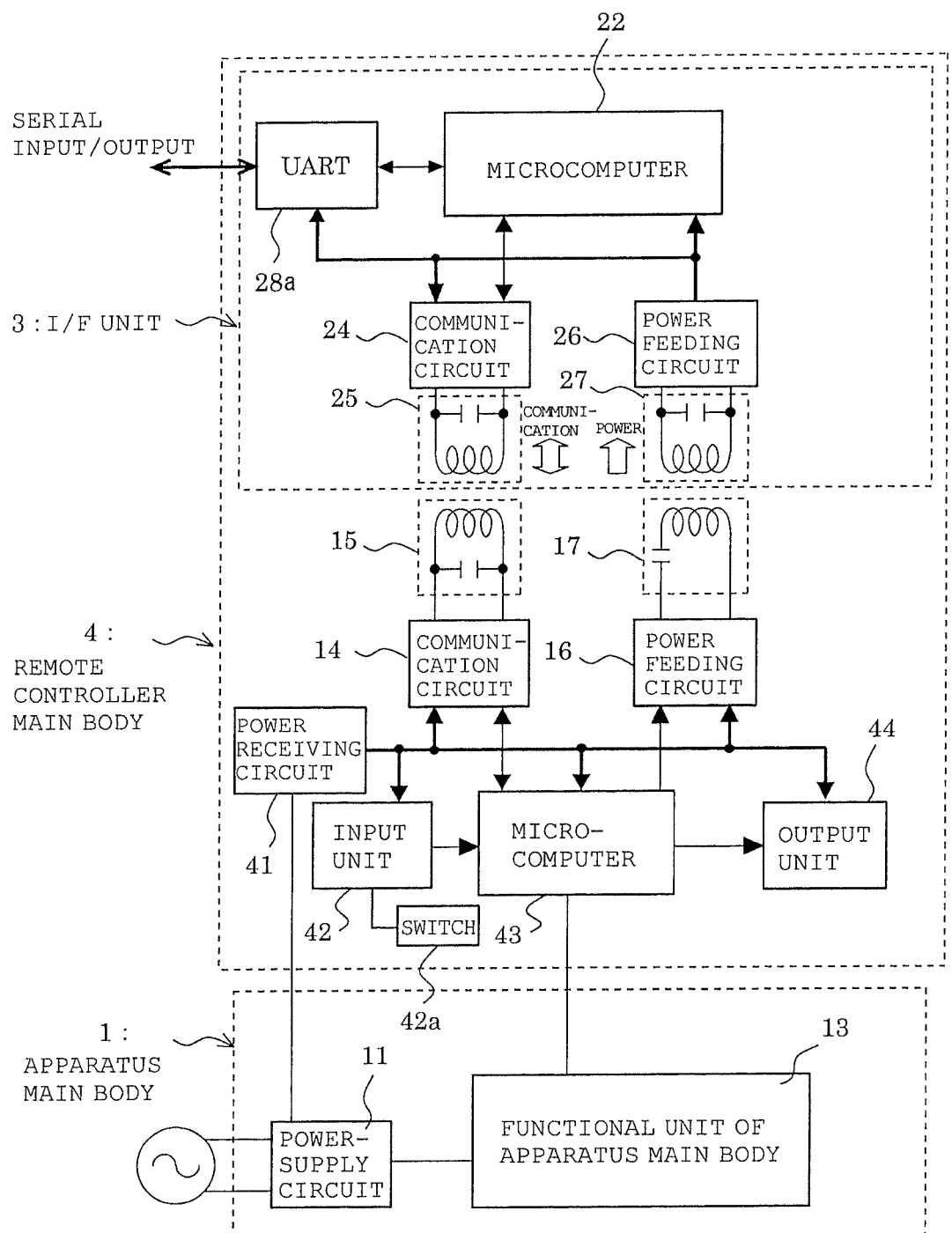
FIG. 8 is a block diagram when a UART is used for an input/output unit of the I/F unit in Embodiment 2.
Figure 9:
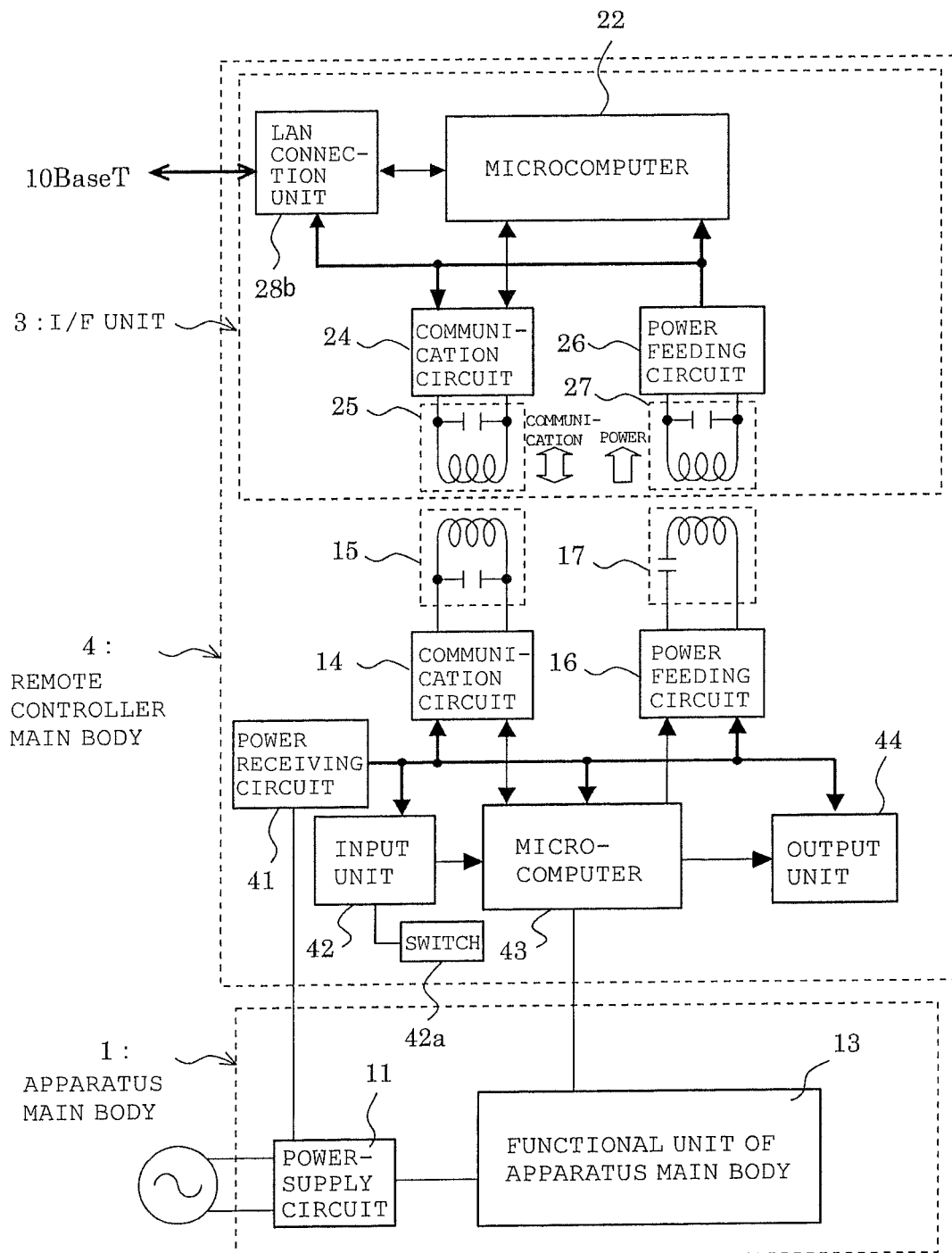
FIG. 9 is a block diagram when a LAN is used for the input/output unit of the I/F unit in Embodiment 2.
Figure 11:
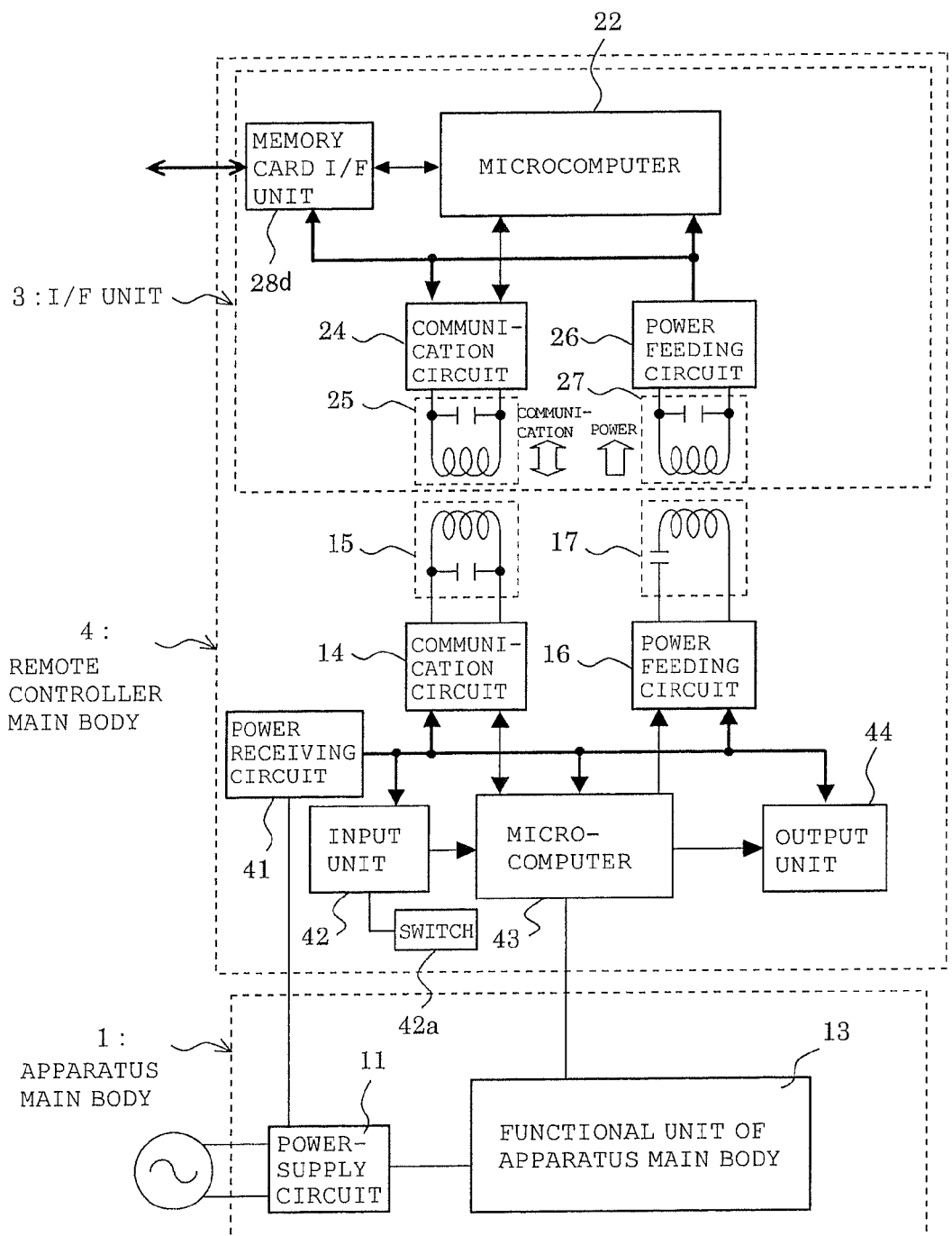
FIG. 11 is a block diagram when a memory card I/F unit is used for the input/output unit of the I/F unit in Embodiment 2.
Figure 12:
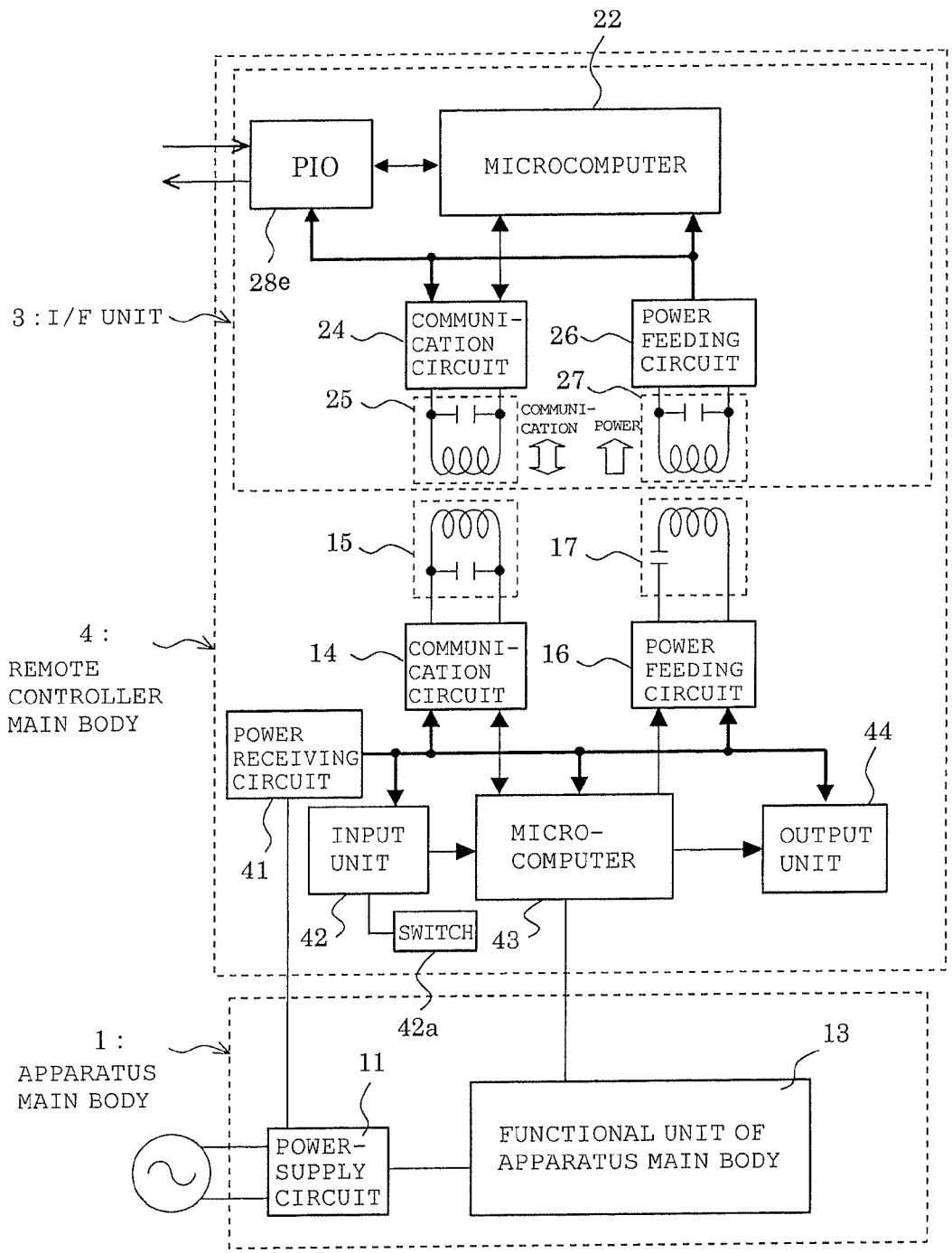
FIG. 12 is a block diagram when a PIO is used for the input/output unit of the I/F unit in Embodiment 2.

Furthermore, in Embodiment 2, as shown in FIG. 8, although the input/output unit 31 of the I/F unit 3 is not particularly specified, the transmission and reception of data may be performed to and from, for example, an external device, such as a personal computer (not shown), by using the UART (Universal Asynchronous Receiver Transmitter) 28a for the input/output unit 31. Furthermore, as shown in FIG. 9, the input/output unit 31 may be the LAN connection unit 28b that is connected to a 10Base-T LAN, or as shown in FIG. 10, the USB (Universal Serial Bus) connection unit 28c may be provided so as to communicate with an external device. Furthermore, as shown in FIG. 11, the memory card I/F unit 28d may be used as the input/output unit 31, and as shown in FIG. 12, the PIO (Parallel input/output) 28e may be used so as to communicate with an external device. These units can be used because the I/F unit 3 is insulated from the power supply of the remote controller main body 4, and can be provided in the I/F unit 3 without taking any structural measures.

Embodiment 3

Although in Embodiment 1, the transmission and reception of data is performed by using the transmission and reception units 15 and 25 of parallel resonance circuits in which a capacitor and a coil are connected in parallel with each other, in present Embodiment 3, the transmission and reception of data is performed by using light. Hereinafter, a description will be given with reference to FIG. 13.

Figure 13:
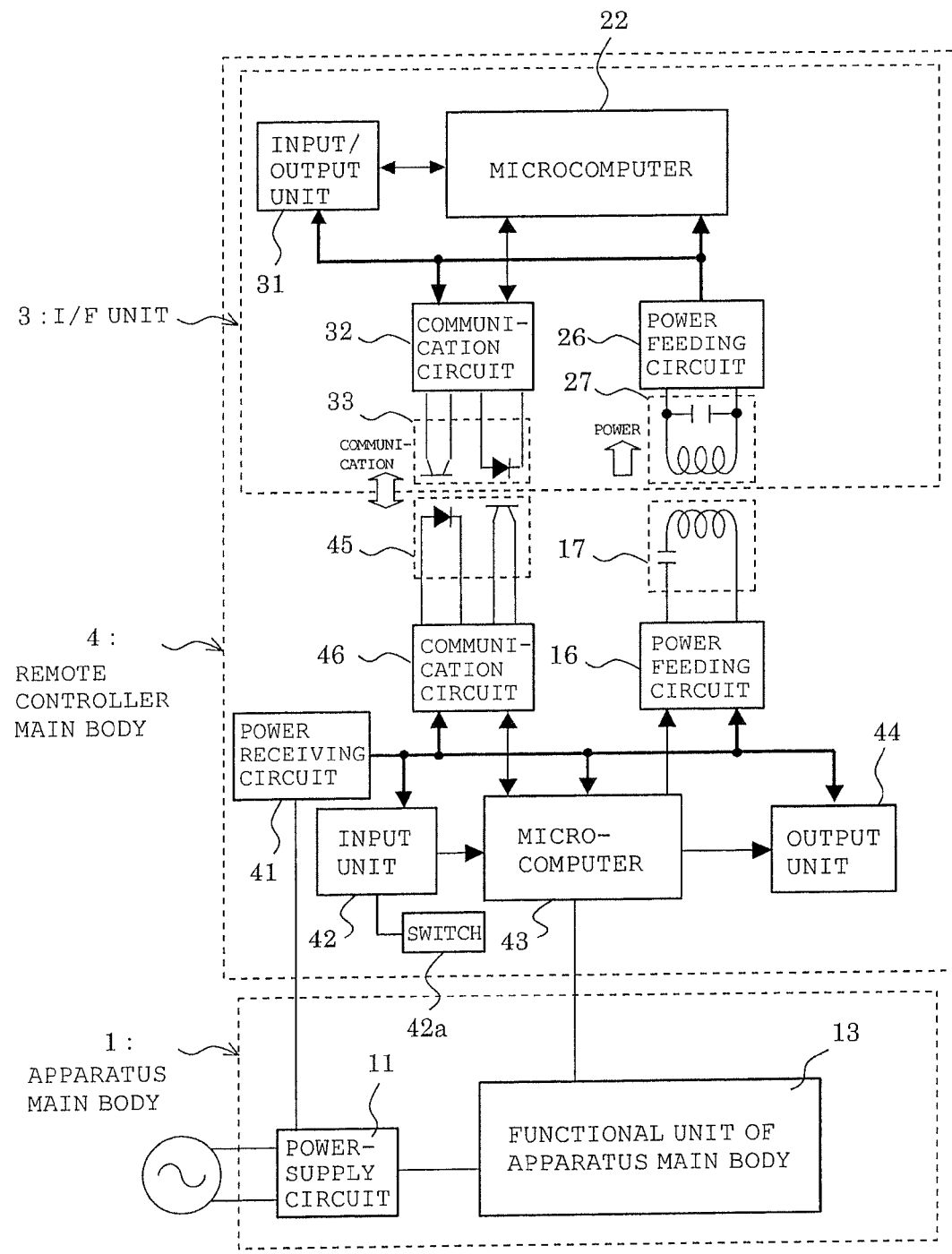
FIG. 13 is a block diagram illustrating an example of the configuration of a remote control apparatus according to Embodiment 3 of the present invention.

FIG. 13 is a block diagram illustrating an example of the configuration of a remote control apparatus according to Embodiment 3 of the present invention.

Components that are the same as or that correspond to those of Embodiment 2 described with reference to FIG. 7 are designated with the same reference numerals, and descriptions thereof are omitted.

In the figure, the communication circuit 32 (communication means) of the I/F unit 3 and the communication circuit 46 of the remote controller main body 4 include, for example, transmission and reception units 33 and 45 formed of a photocoupler. When data is to be transmitted, the transmission and reception units 33 and 45 perform amplitude-shift keying on a high-frequency signal (carrier signal) in accordance with the data, amplifies this data to predetermined electric power, and converts it into light by using a light-emitting diode. When data is to be received, light from a light-emitting diode is converted into a signal by using a phototransistor, this signal is smoothed and the high frequency components are removed, and data is extracted, binarized, and output to the microcomputer 22 or 43.

Next, a description will be given of the operation of the remote control apparatus according to Embodiment 3. Since the operation based on the switch operation of the switch 42a of the input unit 42 of the remote controller main body 4 is the same as that of Embodiment 2, the description thereof is omitted. Furthermore, since the operation of supplying power from the remote controller main body 4 to the I/F unit 3 when the operating state of the functional unit of the apparatus main body 13 is transferred from the input/output unit 31 to the external device on the basis of the operation of the remote controller main body 4, and the operation of supplying power from the remote controller main body 4 to the I/F unit 3 when data is input from the input/output unit 31 to the functional unit of the apparatus main body 13 on the basis of the operation of the remote controller main body 4 are the same as those of Embodiment 2, descriptions thereof are omitted.

The microcomputer 43 of the remote controller main body 4, when detecting an instruction of transferring data indicating the operating state of the functional unit of the apparatus main body 13 to an external device through the input unit 42, outputs a data reading instruction to the functional unit of the apparatus main body 13 through a communication line in accordance with the instruction, and when necessary data is input through the communication line in response to the instruction, the microcomputer 43 causes the power feeding circuit 16 (power feeding means) to operate so as to cause the power-supply circuit 26 (power receiving means) of the I/F unit 3 to receive power. Then, the data obtained from the functional unit of the apparatus main body 13 is output to the communication circuit 46, the high-frequency signal is amplitude-shift keyed, and light is emitted from the light-emitting diode of the transmission and reception unit 45. On the other hand, when the phototransistor of the transmission and reception unit 33 of the I/F unit 3 converts the light into a signal in accordance with the amount of received light, the communication circuit 32 of the I/F unit 3 smoothes the signal from the transmission and reception unit 33 so as to remove the high frequency components, extracts to binarize the data of the functional unit of the apparatus main body 13, and outputs it to the microcomputer 22 of the I/F unit 3 through the buffer. The microcomputer 22 outputs the data from the functional unit of the apparatus main body 13 to the input/output unit 31 in accordance with a predetermined procedure, whereby the data is transferred to the external device.

Furthermore, when the microcomputer 43 of the remote controller main body 4 detects the instruction of transferring the data from the external device to the functional unit of the apparatus main body 13 through the input unit 42, the microcomputer 43 causes the power feeding circuit 16 to operate so as to cause the power-supply circuit 26 of the I/F unit 3 to receive power. Next, the microcomputer 43 outputs the data receiving instruction to the communication circuit 46 in accordance with the instruction from the input unit 42 so as to operate, and causes the transmission and reception unit 45 to emit light. On the other hand, when the phototransistor of the transmission and reception unit 33 of the I/F unit 3 converts the light into a signal on the basis of the amount of received light, the communication circuit 32 of the I/F unit 3 smoothes the signal from the transmission and reception unit 33 so as to remove the high frequency components, extracts to binarize the data receiving instruction output from the microcomputer 43 of the remote controller main body 4, and outputs it to the microcomputer 22 of the I/F unit 3 through the buffer. When the microcomputer 22 detects the data receiving instruction, reads the received data from the input/output unit 31 in accordance with a predetermined procedure, outputs the data to the communication circuit 32 so as to operate, and causes the transmission and reception unit 33 to emit light. At this time, the phototransistor of the transmission and reception unit 45 of the remote controller main body 4 converts the light into a signal on the basis of the amount of received light, and the communication circuit 46 of the remote controller main body 4 smoothes the signal from the transmission and reception unit 45, removes the high frequency components, extracts to binarize the received data from the input/output unit 31, and outputs it to the microcomputer 43 of the remote controller main body 4 through the buffer.

The microcomputer 43 outputs the received data to the functional unit of the apparatus main body 13, and the functional unit of the apparatus main body 13 controls its own state or changes an internal parameter on the basis of the received data.

As described above, according to Embodiment 3, the transmission and reception of data is performed using the transmission and reception units 45 and 33 formed of a photo-coupler for the communication circuits 46 and 32 of the remote controller main body 4 and the I/F unit 3, respectively. Furthermore, since power is supplied from the power feeding circuit 16 to the power-supply circuit 26 using the feeding unit 17 of a series resonance circuit for the power feeding circuit 16 of the remote controller main body 4 and using the power receiving unit 27 of a parallel resonance circuit for the power-supply circuit 26 of the I/F unit 3, it becomes possible to insulate the I/F unit 3 from the power supply of the remote controller main body 4. Consequently, it is not necessary to take measures to reinforce insulation with respect to the power supply, and it is possible to suppress the damage of the I/F unit 3 due to insulation breakdown of the power receiving circuit 41 of the remote controller main body 4 and suppress the flow of an abnormal electrical current into an external device through the input/output unit 31.

In Embodiment 3, when the data of the functional unit of the apparatus main body 13 is to be transferred from the input/output unit 31 to an external device or when the data received by the input/output unit 31 is passed to the functional unit of the apparatus main body 13, the power feeding circuit 16 of the remote controller main body 4 is operated so that the I/F unit 3 is made to receive power. Alternatively, the supply of power to the I/F unit 3 may be performed periodically or constantly, and the microcomputer 22 is made to access the input/output unit 31 so as to make a determination as to the presence or absence of data, and transmission and reception is performed in accordance with the content of the data.

Furthermore, although descriptions have been given by taking examples in which the communication circuits 46 and 32 of the remote controller main body 4 and the I/F unit 3 transmit data in accordance with an amplitude shift keying method, the transmission of data may be performed by using a baseband method, a phase shift keying (PSK) method, a frequency shift keying (FSK) method, a quadrature amplitude modulation (QAM) method, or the like. Furthermore, although the microcomputer 43 is used for the remote controller main body 4, a logic, such as an FPGA (Field Programmable Gate Array), and other control means may be used.

Figure 14:
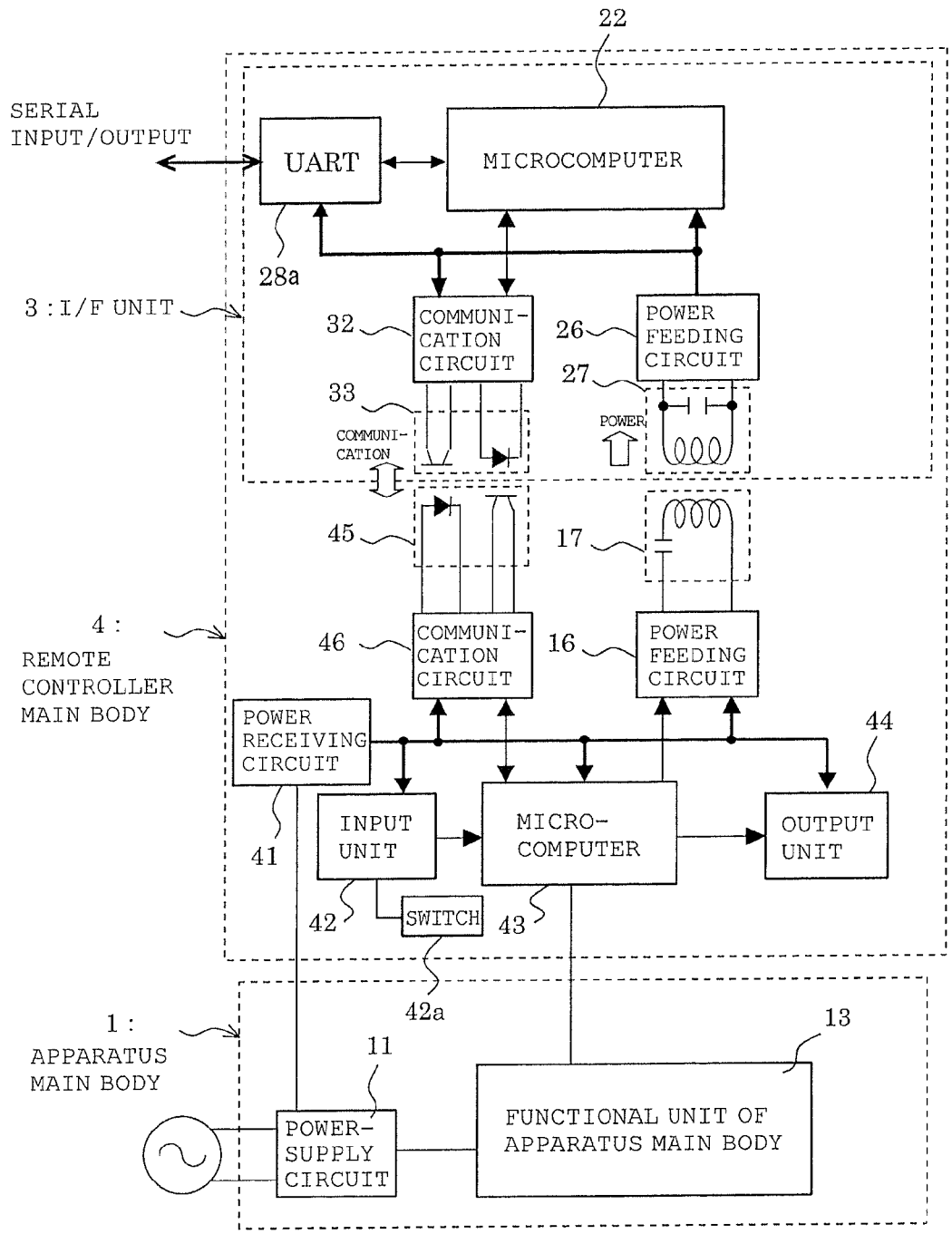
FIG. 14 is a block diagram when a UART is used for the input/output unit of the I/F unit in Embodiment 3.
Figure 15:
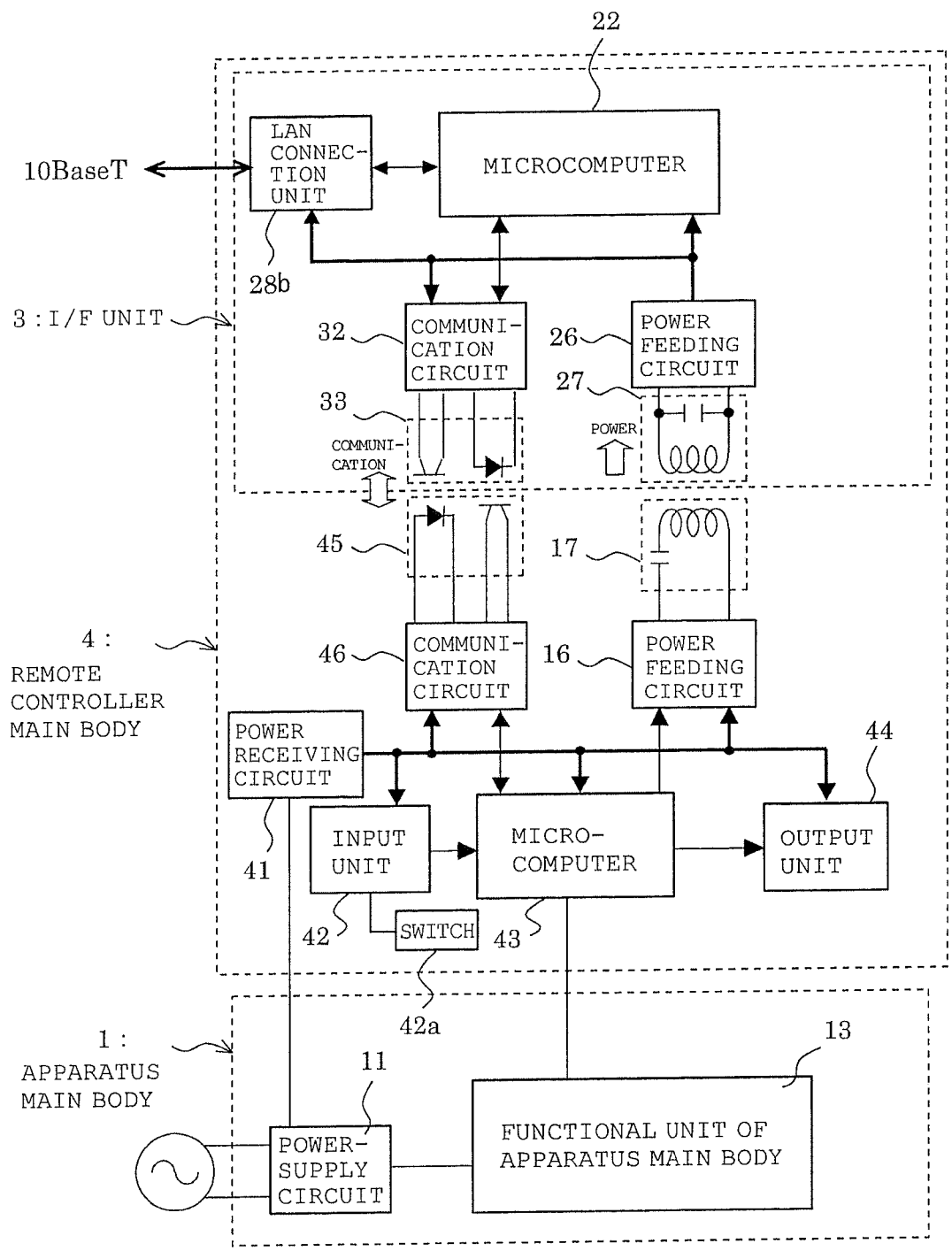
FIG. 15 is a block diagram when a LAN is used for the input/output unit of the I/F unit in Embodiment 3.
Figure 16:
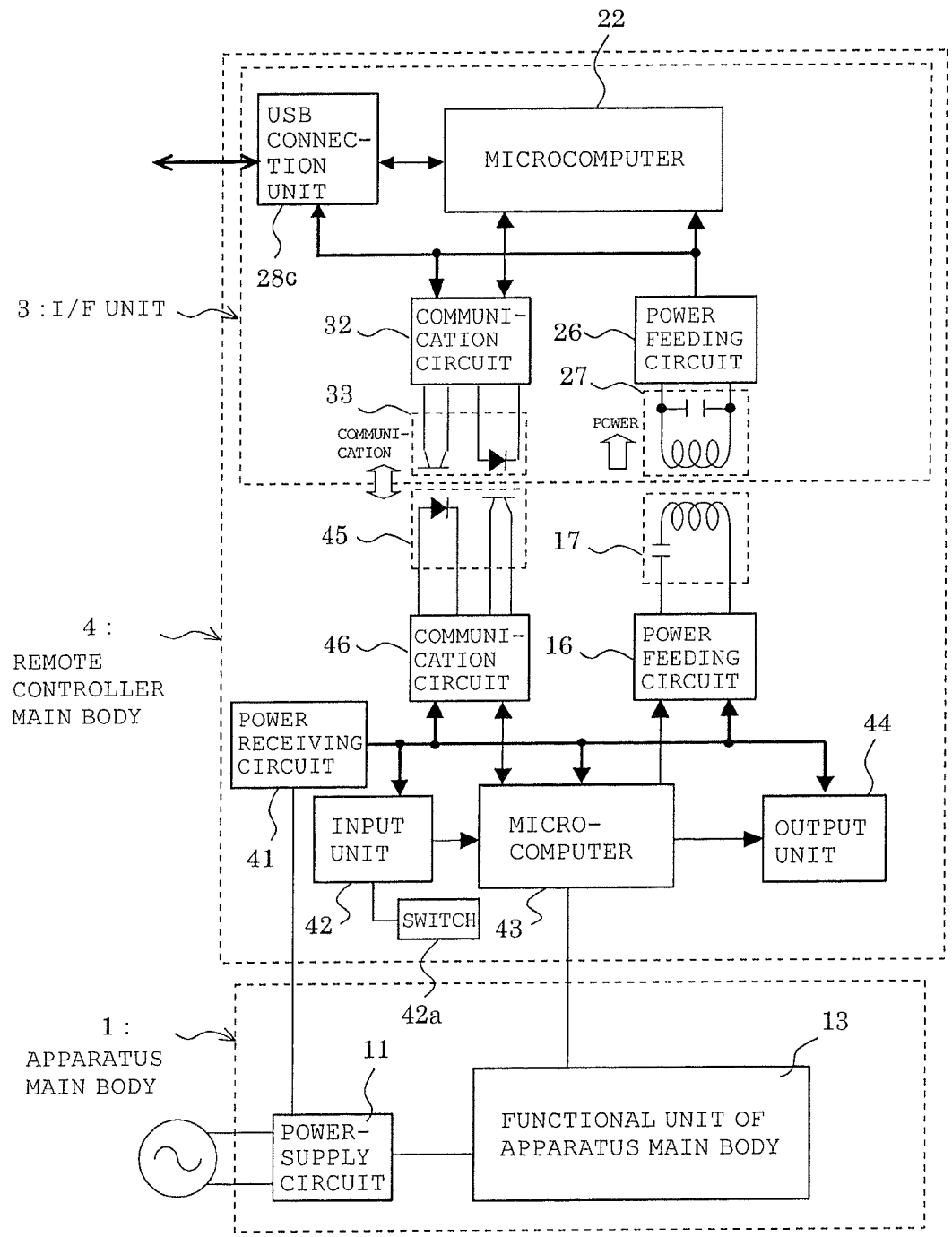
FIG. 16 is a block diagram when a USB is used for the input/output unit of the I/F unit in Embodiment 3.
Figure 17:
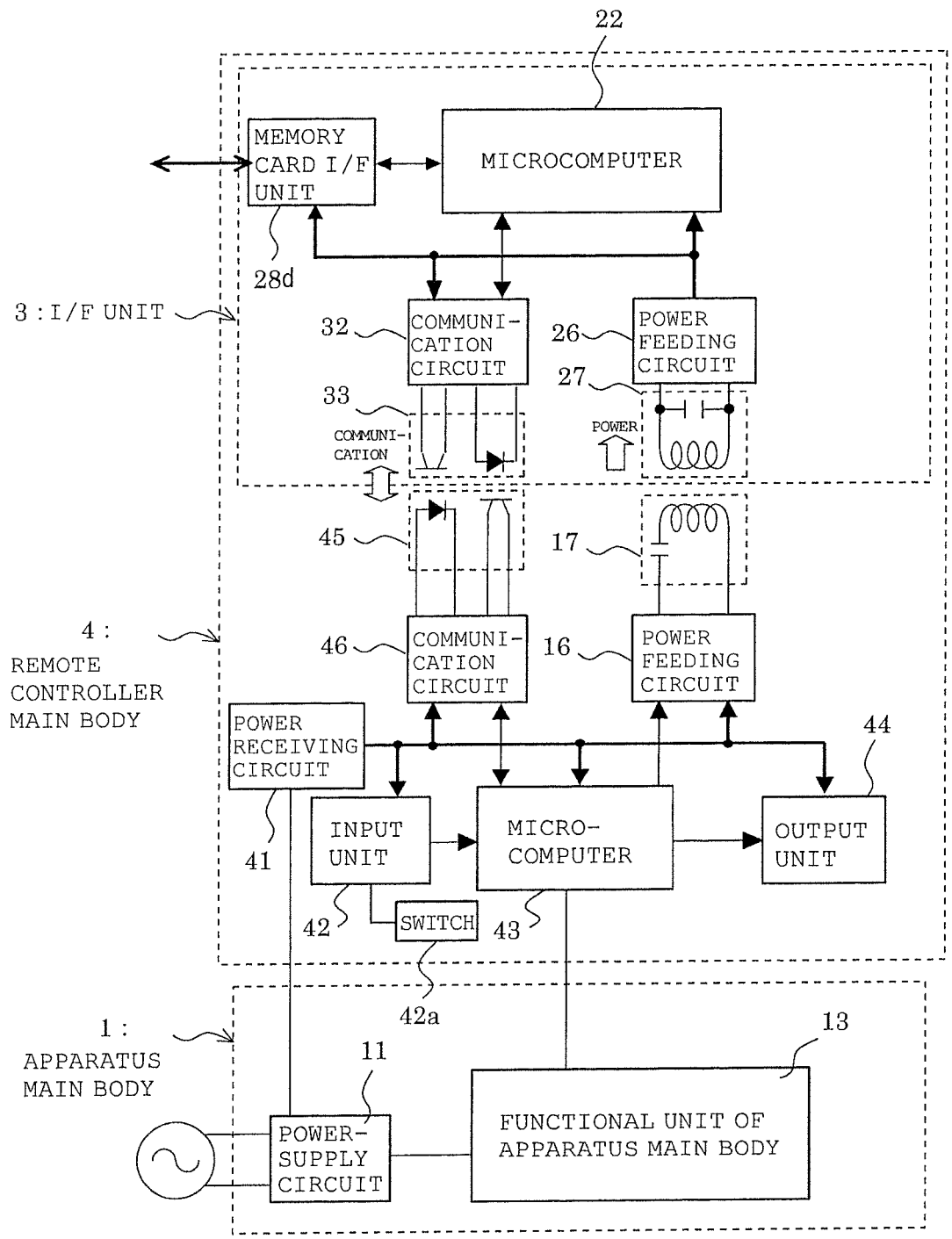
FIG. 17 is a block diagram when a memory card I/F unit is used for the input/output unit of the I/F unit in Embodiment 3.

Furthermore, although in Embodiment 3, the input/output unit 31 of the I/F unit 3 is not particularly specified, as shown in FIG. 14, the UART 28a may be used for the input/output unit 31 so that the transmission and reception of data is performed to and from an external device. Furthermore, as shown in FIG. 15, the LAN connection unit 28b that is connected to a 10Base-T LAN may be used or as shown in FIG. 16, and the USB connection unit 28c may be provided so that communication is performed with an external device. Furthermore, as shown in FIG. 17, the memory card I/F unit 28d may be used as the input/output unit 31, and as shown in FIG. 18, the PIO 28e may be used so that the transmission and reception of data to and from an external device can be performed. These units can be used because the I/F unit 3 is insulated from the power supply of the remote controller main body 4, and can be provided in the I/F unit 3 without taking any structural measures.

INDUSTRIAL APPLICABILITY

Application examples of the input/output apparatus of the present invention include an operation display unit of a household electrical appliance and an input/output apparatus of an FA (Factory Automation) apparatus, and application examples of a remote control apparatus include a controller of a building air conditioner.

The invention claimed is:

1. A remote control apparatus that has an I/F unit in a remote control body and is connected to an electric apparatus connected to a commercial power supply, through a power-supply line and a communication line,
   wherein said remote control body includes a power supply circuit having a coil at an output edge and a communication circuit having a coil at an output edge,
   said I/F unit includes
   power receiving means that has a resonance circuit formed of a coil that is electromagnetically coupled with a coil of said power supply circuit and a capacitor and that converts an AC voltage generated in said resonance circuit by electromagnetic induction from the coil of said power supply circuit to a predetermined constant voltage,
   communication means that has a resonance circuit formed of a coil that is electromagnetically coupled with a coil of said communication circuit and a capacitor and generates a high-frequency magnetic field between the coil of said communication circuit and said resonance circuit to transmit and receive a signal, and
   an input/output unit that transmits and receives signals to and from external devices,
   wherein said input/output unit is connected to said communication means and said power receiving means, and said communication means is connected to said power receiving means, and
   wherein during performance of communication between said external devices connected to said input/output unit and said electric apparatus based on a switch in operation of an input unit, control means in said remote control body operates said power supply circuit so that said power receiving means receives an AC voltage generated in said resonance circuit to supply a predetermined constant voltage from said power receiving means to said communication means and said input/output unit and to transmit and receive a signal between said communication means and said communication circuit.

2. A remote control apparatus that has an I/F unit in a remote control body and is connected to an electric apparatus, connected to a commercial power supply, through a power-supply line and a communication line,
   wherein said remote control body includes a power supply circuit having a coil at an output edge and a communication circuit having an optical wireless medium that transmits and receives a signal via light at an output edge,
   said I/F unit includes
   power receiving means that has a resonance circuit formed of a coil that is electromagnetically coupled with a coil of said power supply circuit and a capacitor and converts an AC voltage generated in said resonance circuit by electromagnetic induction from the coil of said power supply circuit to a predetermined constant voltage, communication means that transmits and receives a signal via light with the optical wireless medium of said communication circuit, and an input/output unit that transmits and receives a signal to and from an external device, wherein said input/output unit is connected to said communication means and said power receiving means, and said communication means is connected to said power receiving means, and wherein during performance of communication between said external devices connected to said input/output unit and said electric apparatus based on a switch in operation of an input unit, control means in said remote control body operates said power supply circuit so that said power receiving means receives an AC voltage generated in said resonance circuit to supply a predetermined constant voltage from said power receiving means to said communication means and said input/output unit and to transmit and receive a signal between said communication means and said communication circuit.

3. The remote control apparatus of claim 1, wherein said input/output unit adopts a start-stop synchronous serial communication unit.

4. The remote control apparatus of claim 1, wherein said input/output unit is a LAN connection unit.

5. The remote control apparatus of claim 1, wherein said input/output unit is a USB connection unit.

6. The remote control apparatus of claim 1, wherein said input/output unit is a memory card I/F unit.

7. The remote control apparatus of claim 1, wherein said input/output unit is a parallel input/output port.

* * * * *